United States Patent
Chilkoor Soundararajan et al.

(10) Patent No.: US 10,829,695 B2
(45) Date of Patent: Nov. 10, 2020

(54) CONVERSION OF BIOMASS INTO A LIQUID HYDROCARBON MATERIAL

(71) Applicant: SHELL OIL COMPANY, Houston, TX (US)

(72) Inventors: Laxmi Narasimhan Chilkoor Soundararajan, Bangalore (IN); Alan Anthony Del Paggio, Spring, TX (US); Dhairya Dilip Mehta, Bangalore (IN); Vikrant Nanasaheb Urade, Bangalore (IN)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 15/777,856

(22) PCT Filed: Nov. 21, 2016

(86) PCT No.: PCT/EP2016/078342
§ 371 (c)(1),
(2) Date: May 21, 2018

(87) PCT Pub. No.: WO2017/089312
PCT Pub. Date: Jun. 1, 2017

(65) Prior Publication Data
US 2018/0346820 A1 Dec. 6, 2018

(30) Foreign Application Priority Data
Nov. 23, 2015 (IN) ............................ 6290/CHE/2015

(51) Int. Cl.
*C10G 3/00* (2006.01)
*C10G 45/52* (2006.01)
(Continued)

(52) U.S. Cl.
CPC ............... *C10G 1/06* (2013.01); *C10G 1/002* (2013.01); *C10G 1/086* (2013.01); *C10G 3/45* (2013.01);
(Continued)

(58) Field of Classification Search
CPC ... C10G 1/06; C10G 1/00; C10G 1/08; C10G 3/00; C10G 45/08; C10G 45/10; C10G 45/50; C10G 45/52
See application file for complete search history.

(56) References Cited

U.S. PATENT DOCUMENTS 5,961,786 A   10/1999  Freel et al.
7,964,761 B2 *  6/2011  Zmierczak ............. C10G 1/002
                                                  44/605

(Continued)

FOREIGN PATENT DOCUMENTS

CA    1283880 C      5/1991
CN    104845654 A    8/2015
(Continued)

OTHER PUBLICATIONS

Schweitzer et al. (Ebullated bed reactor modeling for residue conversion, 2004, Chemical Engineering Science, vol. 59, pp. 5637-5645 (Year: 2004).*

(Continued)

*Primary Examiner* — Youngsul Jeong

(57) ABSTRACT

A process for producing liquid hydrocarbon products from a biomass-containing feedstock and/or a biomass-derived feedstock is provided. The process comprises:
a) contacting the feedstock with a hydropyrolysis catalyst composition and molecular hydrogen in a hydropyrolysis reactor vessel to produce a product stream comprising a deoxygenated hydrocarbon product, $H_2O$, $H_2$, $CO_2$, CO, $C_1$-$C_3$ gases, char and catalyst fines;

(Continued)

b) removing char and catalyst fines from said product stream;

c) cooling the remaining product stream to a temperature of no more than 300° C.; and d) hydroconverting all or a portion of said deoxygenated hydrocarbon product in a hydroconversion reactor in the presence of one or more catalyst compositions suitable for the aromatic saturation of the deoxygenated hydrocarbon product and of the $H_2O$, $CO_2$, CO, $H_2$, and $C_1$-$C_3$ gas generated in step a), to produce a product comprising $C_{4+}$ hydrocarbon product, $H_2O$, CO, $CO_2$, and $C_1$-$C_3$ gases.

20 Claims, 10 Drawing Sheets

(51) Int. Cl.
| | |
|---|---|
| C10G 1/08 | (2006.01) |
| C10G 1/06 | (2006.01) |
| C10G 45/10 | (2006.01) |
| C10G 45/48 | (2006.01) |
| C10G 45/06 | (2006.01) |
| C10G 1/00 | (2006.01) |
| C10G 45/08 | (2006.01) |
| C10G 45/50 | (2006.01) |

(52) U.S. Cl.
CPC ............... *C10G 3/46* (2013.01); *C10G 3/50* (2013.01); *C10G 3/57* (2013.01); *C10G 45/06* (2013.01); *C10G 45/08* (2013.01); *C10G 45/10* (2013.01); *C10G 45/48* (2013.01); *C10G 45/50* (2013.01); *C10G 45/52* (2013.01); *C10G 2300/1014* (2013.01); *C10G 2300/202* (2013.01); *Y02P 30/20* (2015.11)

(56) References Cited

U.S. PATENT DOCUMENTS

| | | | |
|---|---|---|---|
| 9,447,345 B2* | 9/2016 | Powell | C10G 3/42 |
| 2009/0229172 A1 | 9/2009 | Brady et al. | |
| 2010/0256428 A1* | 10/2010 | Marker | C01B 3/16 585/240 |
| 2014/0100395 A1 | 4/2014 | Felix et al. | |
| 2015/0027184 A1* | 1/2015 | Marker | B01D 53/52 71/61 |

FOREIGN PATENT DOCUMENTS

| | | | | |
|---|---|---|---|---|
| FR | 2151059 | A1 | 4/1973 | |
| WO | 2010117437 | A1 | 10/2010 | |
| WO | WO-2012162403 | A1 * | 11/2012 | ............... C10G 3/48 |
| WO | 2015114008 | A1 | 8/2015 | |
| WO | 2016001134 | A1 | 1/2016 | |
| WO | 2016001163 | A1 | 1/2016 | |
| WO | 2016001170 | A1 | 1/2016 | |
| WO | 2017042129 | A1 | 3/2017 | |

OTHER PUBLICATIONS

International Search Report and Written Opinion received for PCT Patent Application No. PCT/EP2016/078342, dated Feb. 3, 2017.
Bridgwater, "Biomass Fast Pyrolysis", Thermal Science, vol. 8, No. 2, 2004, pp. 21-49.
Linck et al., "Integrated biomass hydropyrolysis and hydrotreating: a brief review", Wiley Interdisciplinary Reviews: Energy and Environment, Apr. 8, 2014, vol. 3, No. 6, pp. 575-581, XP055254604.

* cited by examiner

CONVERSION OF BIOMASS INTO A LIQUID HYDROCARBON MATERIAL

PRIORITY CLAIM

The present application is the National Stage (§ 371) of International Application No. PCT/EP2016/078342, filed 21 Nov. 2016, which claims priority from Indian Application No. 6290/CHE/2015, filed 23 Nov. 2015 incorporated herein by reference.

FIELD OF THE INVENTION

The invention relates to a process for converting a biomass-containing or biomass-derived feedstock into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on the carbon footprints of such fuels, it is becoming increasingly important to develop routes to produce liquid transportation fuels from alternative sources in an efficient manner.

Biomass offers a source of renewable carbon and refers to biological material derived from living or deceased organisms and includes lignocellulosic materials (e.g., wood), aquatic materials (e.g., algae, aquatic plants, and seaweed) and animal by-products and wastes (e.g., offal, fats, and sewage sludge). Liquid transportation fuels produced from biomass are sometimes referred to as biofuels. Therefore, when using such biofuels, it may be possible to achieve more sustainable $CO_2$ emissions compared with petroleum-derived fuels.

However, in the conventional pyrolysis of biomass, typically fast pyrolysis carried out in an inert atmosphere, a dense, acidic, reactive, liquid bio-oil product is obtained. This product contains water, oils and char formed during the process. The use of bio-oils produced via conventional pyrolysis is, therefore, subject to several drawbacks. These include increased chemical reactivity, water miscibility, high oxygen content and low heating value of the product. Often these products can be difficult to upgrade to fungible liquid hydrocarbon fuels.

An efficient method for processing biomass into high quality liquid fuels is described in WO2010117437, in the name of Gas Technology Institute.

Solid feedstocks such as feedstocks containing waste plastics and feedstocks containing lignocellulose (e.g. woody biomass, agricultural residues, forestry residues, residues from the wood products and pulp & paper industries and municipal solid waste containing lignocellulosic material, waste plastics and/or food waste) are important feedstocks for biomass to fuel processes due to their availability on a large scale. Lignocellulose comprises a mixture of lignin, cellulose and hemicelluloses in any proportion and usually also contains ash and moisture.

The processes for the conversion of biomass into liquid hydrocarbon fuels described in WO2010117437 uses hydropyrolysis and hydroconversion catalysts. While not being limited to any particular catalyst, exemplary catalysts for use in such processes include sulfided catalysts containing nickel, molybdenum, cobalt or mixtures thereof as active metal(s). Other catalysts for use in the hydropyrolysis and hydroconversion steps for the conversion of biomass to liquid hydrocarbon fuels are described in co-pending applications IN 4737/CHE/15, PCT/EP2015/064749, PCT/EP2015/064691 and PCT/EP2015/064732.

A process for producing liquid hydrocarbons from biomass that utilises a hydropyrolysis/hydroconversion process and a further downstream hydroprocessing reactor containing reduced metal catalysts is described in WO2015114008.

The products from any of these processes may be further separated to produce diesel fuel, gasoline or blending components for gasoline and diesel fuel.

Different specifications for gasoline and diesel fuel may be required in different locations. Material not meeting these specifications may be used as a blending component in a fuel or may need to be upgraded in order to be used as a blending component or as the fuel itself.

Hydrocarbon liquid products produced from biomass by hydropyrolysis-based processes may not fulfil the specifications required for diesel and gasoline range products in a number of locations. For example, such material may have undesirable distribution of various classes of hydrocarbon molecules (aromatics, paraffins and naphthenes) resulting in, for example, poor octane number of gasoline and poor cetane number of diesel product.

The art of hydropyrolysis, therefore, would benefit significantly from processes that provide products with improvements in desired product quality attributes. The ability to produce fully fungible gasoline and/or diesel range products in a simple process from biomass is the ultimate aim. A process with products that can be blended with existing gasoline and diesel fuels (i.e. those derived from crude oil) in high percentages without affecting quality or performance would also be highly desirable.

SUMMARY OF THE INVENTION

Accordingly, the present invention provides a process for producing liquid hydrocarbon products from at least one of a biomass-containing feedstock and a biomass-derived feedstock, said process comprising the steps of:

a) contacting the biomass-containing feedstock and/or biomass-derived feedstock with a hydropyrolysis catalyst composition and molecular hydrogen in a hydropyrolysis reactor vessel at a temperature in the range of from 350 to 600° C., a pressure in the range of from 0.50 to 7.50 MPa and a WHSV of no more than 2.0 kg (biomass)/hour/kg(catalyst), to produce a product stream comprising a deoxygenated hydrocarbon product, $H_2O$, $H_2$, $CO_2$, CO. $C_1$-$C_3$ gases, char and catalyst fines;

b) removing all or a portion of said char and catalyst fines from said product stream;

c) cooling the remaining product stream to a temperature of no more than 300° C.; and d) hydroconverting all or a portion of said deoxygenated hydrocarbon product in a hydroconversion reactor in the presence of one or more catalyst compositions suitable for the aromatic saturation of the deoxygenated hydrocarbon product and of the $H_2O$, $CO_2$, CO, $H_2$, and $C_1$-$C_3$ gas generated in step a), to produce a product comprising $C_{4+}$ hydrocarbon product, $H_2O$, CO, $CO_2$, and $C_1$-$C_3$ gases.

DETAILED DESCRIPTION OF THE INVENTION

Figure 1:
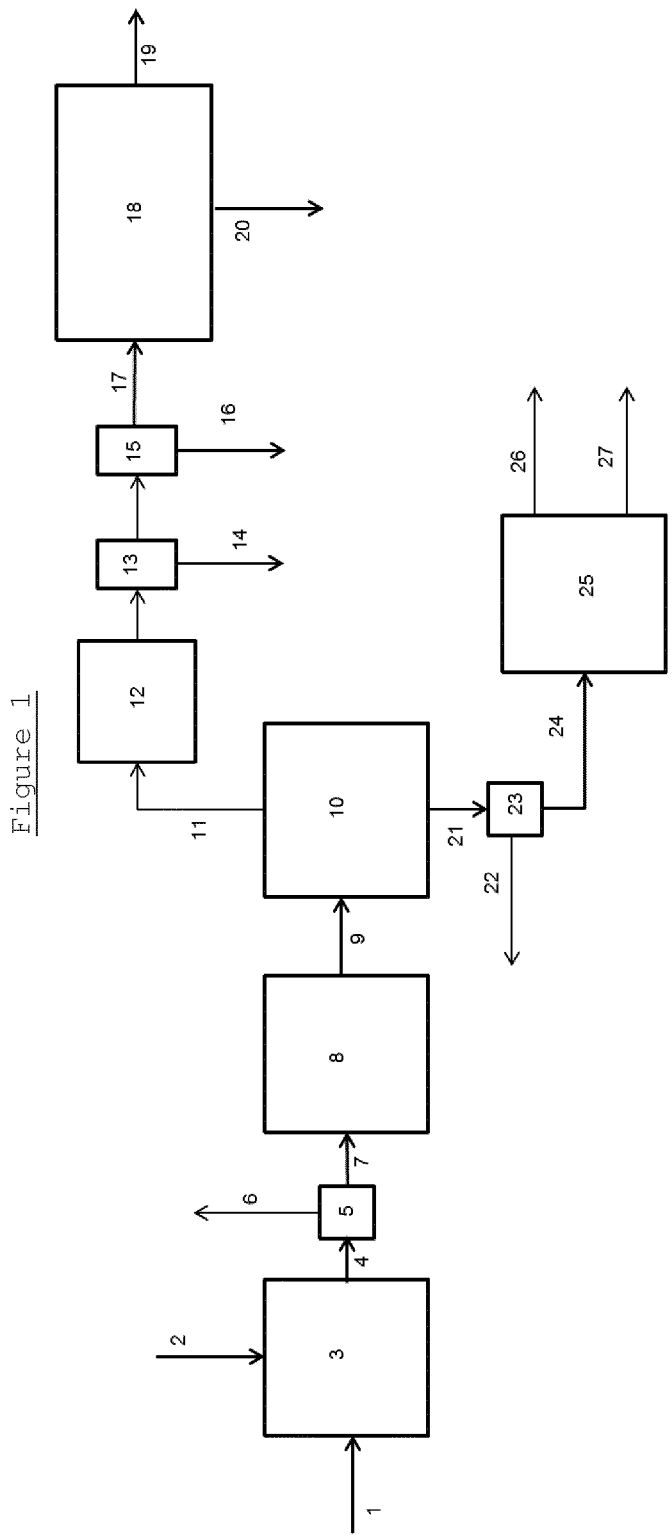
FIGS. 1 and 2 show representations of embodiments of prior art processes.

The present inventors have found that an efficient and high yielding process for the production of liquid hydrocarbon products can be carried out by, in a first step, subjecting a biomass feedstock to hydropyrolysis in the presence of a hydropyrolysis catalyst. This step is carried out at sufficiently low weight hourly space velocity (WHSV), no more than 2.0. kg (biomass)/hour/kg(catalyst), such that the product hydrocarbons are substantially fully deoxygenated. After removal of solid by-products, the product stream is cooled to a temperature of no more than 300° C. and then contacted with one or more catalysts suitable for the aromatic saturation of the deoxygenated hydrocarbon product. The resultant liquid hydrocarbon products have a low level of aromatic materials contained therein.

Biomass Feedstock

The feedstock used in the inventive process contains any combination of biomass-containing and/or biomass-derived feedstock.

The term 'biomass' refers to substances derived from organisms living above the earth's surface or within the earth's oceans, rivers, and/or lakes. Representative biomass can include any plant material, or mixture of plant materials, such as a hardwood (e.g., whitewood), a softwood, a hardwood or softwood bark, lignin, algae, and/or lemna (sea weeds). Energy crops, or otherwise agricultural residues (e.g., logging residues) or other types of plant wastes or plant-derived wastes, may also be used as plant materials. Specific exemplary plant materials include corn fiber, corn stover, castor bean stalks, sugar cane bagasse, sugar cane tops/trash and sorghum, in addition to 'on-purpose' energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include organic oxygenated compounds, such as carbohydrates (e.g., sugars), alcohols, and ketones, as well as organic waste materials, such as waste paper, construction wastes, demolition wastes, and biosludge.

Organic oxygenated compounds of particular interest include those contained in triglyceride-containing components, for example naturally occurring plant (e.g., vegetable) oils and animal fats, or mixtures of such oils and fats (e.g., waste restaurant oils or grease). Triglyceride-containing components, which are representative of particular types of biomass, typically comprise both free fatty acids and triglycerides, with the possible additional presence of monoglycerides and diglycerides. Triglyceride-containing components may also include those comprising derivative classes of compounds such as fatty acid alkyl esters (FAAE), which embrace fatty acid methyl esters (FAME) and fatty acid ethyl esters (FAEE).

Examples of plant oils include rapeseed (including canola) oil, corn oil, colza oil, crambe oil, sunflower oil, soybean oil, hempseed oil, olive oil, linseed oil, mustard oil, palm oil, peanut oil, castor oil, coconut oil, jatropha oil, camelina oil, cottonseed oil, salicornia oil, pennycress oil, algal oil, and other nut oils, and mixtures thereof. Examples of animal fats include lard, offal, tallow, train oil, milk fat, fish oil, sewage sludge, and/or recycled fats of the food industry, including various waste streams such as yellow and brown greases. Mixtures of one or more of these animal fats and one or more of these plant oils are also representative of particular types of biomass. The triglycerides and free fatty acids of a typical plant oil, animal fat, or mixture thereof, may include aliphatic hydrocarbon chains in their structures, with the majority of these chains having from about 8 to about 24 carbon atoms. Representative plant oils and/or animal fats, used as a triglyceride-containing component, may include significant proportions (e.g., at least about 30%, or at least about 50%) of aliphatic (e.g., paraffinic or olefinic) hydrocarbon chains with 16 and 18 carbon atoms. Triglyceride-containing components may be liquid or solid at room temperature. Representative triglyceride-containing components, including plant oils and animal fats, either in their crude form or pretreated, typically have a total oxygen content of about 10-12% by weight. Solid granulated algae that is optionally dried to a low moisture content, may be a suitable type of biomass, and in particular a triglyceride-containing component, in representative embodiments.

Low-quality and/or crude triglyceride-containing components, such as brown grease, are representative of biomass. Advantageously, such triglyceride-containing components may be introduced, according to specific embodiments, directly into the hydropyrolysis reactor without pretreatment, such that the reactor itself effectively performs the required transformations that allow the products of the hydropyrolysis of such low-quality and/or crude triglyceride-containing components, to be further processed in a hydroconversion reactor in an effective manner. Representative triglyceride-containing components, for example, include those that have a total chloride or metals content, and in some cases a total alkali metal and alkaline earth metal content, of greater than about 10 ppm (e.g. from about 10 ppm to about 500 ppm), or greater than about 25 ppm (e.g. from about 25 ppm to about 250 ppm). Such levels of contaminant chloride or metals, and particularly alkali and alkaline earth metals, are detrimental to catalyst activity in many types of conventional hydroprocessing operations.

A biomass-containing feedstock may comprise all or substantially all biomass, but may also contain non-biological materials (e.g., materials derived from petroleum, such as plastics, or materials derived from minerals extracted from the earth, such as metals and metal oxides, including glass). An example of a "biomass-containing" feedstock that may comprise one or more non-biological materials is municipal solid waste (MSW).

Such municipal solid waste may comprise any combination of lignocellulosic material (yard trimmings, pressure-treated wood such as fence posts, plywood), discarded paper and cardboard, food waste, textile waste, along with refractories such as glass, metal. Prior to use in the process of this invention, municipal solid waste may be optionally converted, after removal of at least a portion of any refractories, such as glass or metal, into pellet or briquette form. Co-processing of MSW with lignocellulosic waste is also envisaged. Certain food waste may be combined with sawdust or other material and, optionally, pelletised prior to use in the process of the invention.

Another specific example of a biomass-containing feedstock comprises biomass, as described herein, in addition to one or more oxygenated polymers (e.g., plastics) that contain oxygen in the functional groups of their repeating monomeric substituents. The oxygen is at least partly removed in deoxygenation reactions occurring in the hydropyrolysis and/or hydroconversion reactors of processes described herein, through the production of $H_2O$, $CO$, and/or $CO_2$. The remainder of the polymeric structure may be used to generate either aliphatic or aromatic hydrocarbons in the substantially fully deoxygenated hydrocarbon product or liquid hydrocarbon fuel. Representative oxygenated plastics have an oxygen content of at least 10% by weight (e.g., in the range from about 10 to about 45% by weight), with specific examples of oxygenated plastic co-feeds being polycarbonates (e.g., $(C_{15}H_{16}O_2)_n$, approx. 14% by weight O), poly (methyl methacrylate) (PMMA, $(C_5H_8O_2)_n$, approx. 32% by weight O), polyethylene terephthalate (PET, $(C_{10}H_8O_4)_n$, approx. 33% by weight O), and polyamines (e.g. $(CONH_2)_n$, approx. 36% by weight O). Due to the presence of hydrocarbon ring structures in certain oxygenated polymers (e.g. PET and polycarbonates), these oxygenated polymers may produce a relatively higher yield of aromatic hydrocarbons compared to aliphatic hydrocarbons in processes described herein, whereas other oxygenated polymers may produce a relatively higher yield of aliphatic hydrocarbons compared to aromatic hydrocarbons.

The term 'biomass-derived', for example when used in the phrase biomass-derived feedstock, refers to products resulting or obtained from the thermal and/or chemical transformation of biomass, as defined above, or biomass-containing feedstocks. Representative biomass-derived feedstocks therefore include, but are not limited to, products of pyrolysis (e.g. bio-oils), torrefaction (e.g. torrefied and optionally densified wood), hydrothermal carbonization (e.g. biomass that is pretreated and densified by acid hydrolysis in hot, compressed water), and polymerization (e.g. organic polymers derived from plant monomers). Other specific examples of biomass-derived products (e.g. for use as feedstocks) include black liquor, pure lignin, and lignin sulfonate.

Thermal and/or chemical transformation of biomass may occur in a pretreatment step prior to, or upstream of, the use of the resulting biomass-derived feedstock in processes described herein, including in a hydropyrolysis or hydroconversion step. Representative pretreating steps may use a pretreating reactor (pre-reactor), upstream of a hydropyrolysis reactor, and involve devolatilisation and/or at least some hydropyrolysis of a biomass-containing feedstock. Such devolatilisation and optional hydropyrolysis may be accompanied by other, beneficial transformations, for example to reduce corrosive species content, reduce hydropyrolysis catalyst poison content (e.g. reduce sodium), and/or a reduce hydroconversion catalyst poison content. Pretreatment in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the biomass-derived feedstock. Suitable solid bed materials include those having dual or multiple functions. In the case of a pretreating catalyst, those having activity for hydroprocessing of the biomass, described herein, are representative. Certain pretreated feedstocks, for example resulting or obtained from devolatilisation and/or at least some hydropyrolysis, are also biomass-derived feedstocks, whereas other pretreated feedstocks, for example resulting or obtained from classification without thermal or chemical transformation, are biomass-containing feedstocks, but not biomass-derived feedstocks.

Biomass-derived feedstocks also include products of a Biomass to Liquid (BTL) pathway, which may be products of Fischer-Tropsch (F-T) synthesis, and more specifically the products of gasification, followed by F-T synthesis. These products are generally of significantly lower quality, compared to their counterpart, paraffin-rich petroleum derived products used for fuel blending. This quality deficit results from the presence of biomass-derived aliphatic alcohols and other biomass-derived organic oxygenated by-product compounds, as well as possibly reactive olefins, with amounts of these non-paraffinic impurities depending on the F-T catalyst system and processing conditions used. Representative total oxygen contents of F-T synthesis products, as biomass-derived feedstocks, are typically in the range from about 0.25% to about 10%, and often from about 0.5% to about 5% by weight. In addition, products of F-T synthesis, including F-T waxes, have a wide carbon number (and consequently molecular weight) distribution and very poor cold flow properties. Both of these characteristics may be improved using appropriate transformations in processes described herein, for example in the hydroconversion step, to convert F-T waxes into a paraffin-rich component, with a lower average molecular weight (and narrower molecular weight distribution) and/or with a greater degree of branching (or content of isoparaffins), in order to meet specifications for distillate fuel fractions of the substantially fully deoxygenated hydrocarbon product or liquid hydrocarbon, such as a diesel boiling range fraction and/or an aviation (e.g., jet) fuel boiling range fraction.

Gasification (e.g., non-catalytic partial oxidation) of a wide variety of carbonaceous feedstocks, including biomass as defined above, may provide the syngas used for F-T synthesis. F-T synthesis refers to a process for converting syngas, namely a mixture of CO and $H_2$ into hydrocarbons of advancing molecular weight according to the reaction:

$$n(CO+2H_2) \rightarrow (-CH_2-)_n + nH_2O + \text{heat}.$$

The F-T synthesis reaction generates reaction products having a wide range of molecular weights, from that of methane to those of heavy paraffin waxes. The particular mixture of generally non-cyclic paraffinic and olefinic hydrocarbons, as well as the proportions of these reaction products, are governed substantially by the catalyst system used. Normally, the production of methane is minimised and a substantial portion of the hydrocarbons produced have a carbon chain length of a least 5 carbon atoms. Therefore, $C_5^+$ hydrocarbons are present in the F-T synthesis product in an amount generally of at least about 60% (e.g., from about 60% to about 99%), and typically at least about 70% (e.g. from about 70% to about 95%) by weight. The F-T synthesis product may be pretreated for the removal of light hydrocarbons (e.g., $C_1$-$C_4$ hydrocarbons) and water. However, since these components are well-tolerated in processes described herein, and are even beneficial in some cases (e.g., for the production of required hydrogen via reforming), raw products of F-T synthesis (i.e., without pretreatment) may also be suitable as biomass-derived feedstocks. Such raw products may have a combined, $C_1$-$C_4$ hydrocarbon and oxygenated hydrocarbon content of greater than about 1% by volume, and even greater than 5% by volume.

As in the case of certain F-T synthesis products, other types of crude or low-quality biomass or biomass-derived feedstocks, for example particular triglyceride-containing components such as brown grease, may be pretreated. Brown grease includes solid particulates such as rotten food particles. Crude triglyceride-containing components may otherwise include phospholipids (gums) and metal contaminants, including alkali and alkaline earth metals. Due to a high solids content, high hydroconversion catalyst poison content, and/or propensity to cause hydroconversion catalyst plugging, low-quality and/or crude triglyceride-containing components may be suitably upgraded by pretreatment to reduce the content of solids or other of these undesirable materials. A pretreated triglyceride-containing component represents a particular type of biomass-derived feedstock.

Biomass-derived feedstocks also extend to pretreated feedstocks that result or are obtained from thermal and/or chemical transformation, prior to, or upstream of, their use as feedstocks for processes described herein. Particular biomass-derived feedstocks are conventional pyrolysis oils, i.e. products of conventional pyrolysis processes, including fast pyrolysis processes as described in U.S. Pat. No. 5,961,786, CA1283880 and by Bridgwater, A. V., 'Biomass Fast Pyrolysis' Review paper BIBLID: 0354-9836, 8 (2004), 2, 21-49). Representative biomass-derived feedstocks in which the original lignocellulosic components have been transformed may comprise a significant quantity, for example generally from about 5% to about 85%, and often from about 10% to about 75%, by weight of cyclic compounds, including cyclic organic oxygenates. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., naphthenic), completely unsaturated (e.g., aromatic), or partially unsaturated. After being subjected to hydroconversion in processes described herein, these cyclic compounds, including cyclic organic oxygenates, may contribute to the total aromatic hydrocarbon content of the substantially fully deoxygenated hydrocarbon product or liquid hydrocarbon fuel. These cyclic compounds are preferably obtained from natural sources, such as lignocellulosic biomass, as described above, that has been pyrolyzed to depolymerise and fragment the cyclic building blocks of cellulose, hemicellulose, and lignin.

A representative biomass-derived feedstock is therefore conventional pyrolysis oil (bio-oil), containing significant quantities of cyclic compounds (e.g., generally from about 10% to about 90% by weight, and typically from about 20% to about 80% by weight), as described above, that are precursors, in processes described herein, to aromatic hydrocarbons. Pyrolysis oil contains often from about 30% to about 40%, by weight of total oxygen, for example in the form of both (i) organic oxygenates, such as hydroxyaldehydes, hydroxyketones, sugars, carboxylic acids, and phenolic oligomers, and (ii) dissolved water. For this reason, although a pourable and transportable liquid fuel, pyrolysis oil (and particularly raw pyrolysis oil that has not been pretreated) has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. In processes as described herein, pyrolysis oil may be further deoxygenated and undergo other transformations to yield hydrocarbons in the substantially fully deoxygenated hydrocarbon liquid or liquid hydrocarbon fuel recovered from the hydroconversion step. According to some embodiments, aromatic hydrocarbons derived from conventional pyrolysis oil may be concentrated in a liquid product following fractionation of the substantially fully deoxygenated hydrocarbon liquid, whereby the product is suitable for blending in fuels, such as gasoline, or otherwise is useful as such a fuel without blending (e.g., a gasoline boiling range fraction meeting one or more, and possibly all, applicable gasoline specifications).

Further specific examples of biomass-derived feedstocks include by-products of Kraft or sulfate processing for the conversion of wood into pulp. These by-products include black liquor, tall oil, pure lignin, and lignin sulfonate. Tall oil refers to a resinous yellow-black oily liquid, which is namely an acidified by-product of pine wood processing. Tall oil, prior to refining, is normally a mixture of rosin acids, fatty acids, sterols, high-molecular weight alcohols, and other alkyl chain materials. Distillation of crude tall oil may be used to recover a tall oil fraction (depitched tall oil) that is enriched in the rosin acids, for use as a biomass-derived feedstock that produces a relatively higher yield of aromatic hydrocarbons compared to aliphatic hydrocarbons.

Naturally derived (e.g., non-fossil derived) oils rich in cyclic compounds, and therefore useful as biomass-derived feedstocks, including pyrolysis oil, and Kraft or sulfate processing by-products (e.g., black liquor, crude tall oil, and depitched tall oil) as described herein, have a high oxygenate content that is detrimental to their value for use as biofuels, without deoxygenation. In the case of tall oil, for example, rosin acids (all multi-ring organic acids) are present in significant concentrations. Deoxygenation of these oxygenated cyclic compounds under hydropyrolysis and/or hydroconversion conditions beneficially yields aromatic hydrocarbons. In combination with oxygen removal, ring saturation and/or ring opening of at least one ring (but not all rings) of the multi-ring compounds leads to the formation of naphthenic and/or alkylated cyclic hydrocarbons, respectively. Importantly, the naphthenic/aromatic hydrocarbon equilibrium under the particular hydropyrolysis and/or hydroconversion conditions used, may be used to govern the relative proportions of these species and thereby meet desired specifications for a particular application, for example the yield, or content, of aromatic hydrocarbons in a gasoline boiling range fraction or aviation fuel boiling range fraction of the substantially fully deoxygenated hydrocarbon product or liquid hydrocarbon, as needed to meet desired specifications (e.g. octane number in the case of gasoline specifications or aromatic hydrocarbon content in the case of aviation (non-turbine or jet) fuel specifications).

Yet further examples of biomass-derived feedstocks include oils obtained from aromatic foliage such as eucalyptols, as well as solid granulated lignin that is optionally dried to a low moisture content. These examples can also ultimately lead to the formation of aromatic hydrocarbons in the substantially fully deoxygenated hydrocarbon product or liquid hydrocarbon fuel.

Representative biomass-derived feedstocks may be pretreated to improve quality, prior to introduction into processes as described herein. Tall oil, for example, may be used either in its crude form or may otherwise be pretreated by distillation (e.g., vacuum distillation) to remove pitch (i.e., providing depitched tall oil) and/or concentrate the rosin acids, which are primarily abietic acid and dehydroabietic acid but include other cyclic carboxylic acids. A biomass-derived feedstock may in general be obtained by a pretreatment involving separation to remove unwanted materials, for example from a crude tall oil or a crude pyrolysis oil (bio-oil). In the case of crude bio-oil, for example, pretreatment by filtration and/or ion exchange may be used to remove solids and/or soluble metals, prior to introduction of the pretreated bio-oil to a process as described herein. According to other embodiments, biomass-derived feedstocks in a crude or low-quality form, such as crude bio-oil or black liquor, may also be advantageously introduced directly into processes as described herein without such pretreatment steps, such that one or more process steps (e.g., hydropyrolysis and/or hydroconversion) may itself perform the necessary pretreatment and/or desired further transformations to ultimately yield liquid hydrocarbons. In the case of a hydropyrolysis reactor performing a pretreatment step, the deoxygenated hydrocarbon product, including products of the hydropyrolysis of a crude or low-quality biomass-derived feedstock, can be further processed in a hydroconversion step in an effective manner.

Any of the types of biomass-containing and biomass-derived feedstocks described herein may be combined and introduced to processes as described herein, or otherwise introduced separately, for example at differing axial positions into the hydropyrolysis and/or hydroconversion reactor. Different types of biomass-containing and/or biomass-derived feedstocks may be introduced into either the hydropyrolysis reactor or the hydroconversion reactor, although, according to particular embodiments described above, the introduction into one of these reactors (e.g., in the case of a crude or low-quality biomass-derived feedstock being introduced into the hydropyrolysis reactor vessel) may be preferable.

Hydropyrolysis Step

The hydropyrolysis catalyst composition of the present invention preferably comprises one or more active metals selected from cobalt, molybdenum, nickel, tungsten, ruthenium, platinum, palladium, iridium and iron. Preferably, the one or more active metals are selected from cobalt, molybdenum, nickel and tungsten.

The metals present in the hydropyrolysis catalyst composition used in the process of the present invention are supported, preferably on a metal oxide support. Metal oxides useful as supports for the hydropyrolysis catalyst composition include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalised fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the hydropyrolysis catalyst compositions are preferably in the range of from 0.05 wt % to 2 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Additional elements such as one or more of phosphorous, boron and nickel may be incorporated into the catalyst to improve the dispersion of the active metal.

The hydropyrolysis catalyst composition used in the process of the present invention may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The hydropyrolysis catalyst composition may be provided to the reactor in an oxidic state, a sulfided or sulfurised state or in a pre-reduced state. Preferably, the hydropyrolysis catalyst composition is provided in an oxidic state or a pre-reduced state, more preferably in an oxidic state to the reactor in the process of the present invention.

Therefore, in one embodiment of the invention, after preparation by one of the above or another method, the compositions thus-formed are suitably calcined in the presence of air or oxygen in order to obtain the oxidic state. By the term 'oxidic state' as used herein is meant that 95% or more of the active metal atoms present are present in an oxidation state greater than zero as oxides. For example, a supported oxidic cobalt catalyst has more than 95% of the cobalt present in the +2 or +3 oxidation state, as oxides, and a supported oxidic nickel catalyst has more than 95% of the nickel present in the +2 oxidation state, as oxide.

In another embodiment of the invention, after preparation by one of the above or another method, the compositions thus-formed are suitably subjected to a reduction step in order to convert at least a portion of the active metals into their fully reduced state. This can be carried out by subjecting the catalyst to a reducing gas (for example, gas containing hydrogen) at elevated temperatures and elevated pressures. The temperatures of the reduction step can vary from 120° C. to 450° C. and pressures can vary from 0.1 megapascal to 10 megapascal.

In a further embodiment of the invention, after preparation by one of the above or another method, the compositions thus-formed are suitably subjected to a sulfidation step in order to convert at least a portion of the active metals into their sulfided form. This can be carried out by subjecting the catalyst to a sulfur-containing fluid at elevated temperatures and pressures. Typical sulfur containing fluids include liquid hydrocarbons containing sulfur dopants or sulfur compounds occurring naturally in the hydrocarbons, and gaseous streams containing hydrogen sulfide. In this embodiment of the invention, the one or more active metals are preferably selected from cobalt, molybdenum, nickel, iron and tungsten. Typical pressures for sulfidation step range from 0.5 MPa to 10 MPa, while typical temperatures range from 150° C. to 450° C. Alternatively, the catalysts may be sulfurised, such that sulfur species are present on the catalyst, which sulfur species will react with the active metal under the conditions in the reactor vessel in order to from the sulfided catalyst.

It will be readily apparent that, although the hydropyrolysis catalyst composition provided in the hydropyrolysis reactor will initially comprise metal or metals in their oxidic, sulfided or reduced states, the chemical form of the catalyst composition will undergo a change under the operating environment of the process, resulting in a change in the chemical form of the active metals on the catalyst and of the support as well. This change will involve phenomena resulting from the interaction of the catalyst with the reactant gas (hydrogen, carbon monoxide, carbon dioxide), products (hydrocarbons) and by-products (water, carbon monoxide, carbon dioxide, ammonia, hydrogen sulfide et cetera) under the temperature and pressure conditions of the process.

It is postulated, without wishing to be bound by theory, that the initial chemical composition will be transformed under the conditions of the process of the invention into a composition where a portion of the active metals may be in reduced form (with an oxidation number of zero), another portion of the active metals may be in a higher oxidation state in sulfided form (forming a chemical bond with sulfur atoms present in the biomass feedstock) and yet another portion of the active metals may be in a higher oxidation state in oxidic form (with oxygen atoms available from the biomass feedstock or from the catalyst itself).

Further catalyst may be added to the process as it progresses in order to replace catalyst lost through attrition. Such catalyst will also be initially provided to the reactor with the active metals being present in their oxidic, sulfided or pre-reduced state, depending on the state of the original catalyst composition.

The hydropyrolysis catalyst composition is preferably present in the form of spherical catalyst particles. Catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

Although any type of reactor suitable for hydropyrolysis may be employed, the preferred type of reactor is a bubbling fluidised bed reactor. The fluidization velocity, catalyst size and bulk density and feedstock size and bulk density are chosen such that the catalyst remains in the bubbling fluidised bed, while the char produced gets entrained out of the reactor.

The hydropyrolysis is suitably carried out in the hydropyrolysis reactor vessel at a temperature in the range of from 350° C. to 600° C. and a pressure in the range of from 0.50 MPa to 7.50 MPa. The heating rate of the biomass is preferably greater than about 100 W/m$^2$. The weight hourly space velocity (WHSV) in g(biomass)/g(catalyst)/hr for this step is no more than 2.0 h$^{-1}$, more preferably no more than 1.7 h$^{-1}$, even more preferably no more than 1.5 h$^{-1}$. The WHSV in this process is preferably at least 0.2 h$^{-1}$, more preferably at least 0.3 h$^{-1}$.

The vapour phase product of the hydropyrolysis step comprises a deoxygenated hydrocarbon product, $H_2O$, $CO_2$, CO, $C_1$-$C_3$ gases, char and catalyst fines. The deoxygenated hydrocarbon product preferably comprises no more than 10 wt %, more preferably no more than 5 wt %, even more preferably no more than 2 wt % of the oxygen in the biomass feedstock, excluding that contained in the free moisture in the feedstock. This oxygen is removed in the form of $H_2O$, CO and $CO_2$ in the hydropyrolysis step. Although it is possible that nearly 100 wt % of the oxygen present in the original biomass is removed, typically at most 99 wt % will be removed in the hydropyrolysis step.

Char Removal, Cooling and Other Process Steps

Char and catalyst fines are removed from the product stream of the hydropyrolysis step. Any ash present will normally also be removed at this stage. The most preferred method of char and catalyst fines removal from the vapour stream is by cyclone separation. Solids separation equipment (e.g. cyclones) may also be used inside the hydroprocessing reactor (above a dense bed phase) to prevent the entrainment of solid particles above a certain particle size.

Char may also be removed in accordance with the process of this invention by filtration from the vapour stream, or by way of filtering from a wash step-ebullated bed. Backpulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilised the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilised oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometers).

Any ash and catalyst fines present may also be removed in the char removal step.

The remaining product stream is then cooled to a temperature of no more than 300° C., preferably no more than 250° C. Preferably, the stream is cooled to a temperature of at least 100° C., more preferably at least 120, even more preferably at least 150° C.

Depending on the composition of the remaining product stream, such cooling may lead to condensation of both aqueous and organic materials. Optionally, at this stage, therefore, any non-organic liquid produced in this cooling step may be removed, for example by using a 3-phase gas/liquid separator. Any condensed organic material may be provided to the hydroconversion reactor with the rest of the deoxygenated hydrocarbon product for further processing.

Optionally, before or after cooling, if any sulfur is present in the remaining product stream, said product stream may be subjected to sulfur removal. In the embodiment wherein the hydropyrolysis catalyst composition is provided to the hydropyrolysis reactor vessel in a sulfided or sulfurised form, such a sulfur removal step will be required. In other embodiments of the invention, the need for a sulfur removal step will depend on the amount of sulfur present in the biomass-containing or biomass-derived feedstock.

Organic sulfur may be removed in a separate reactor containing a hydrodesulfurisation (HDS) catalyst.

Suitable HDS reactors and catalysts are known in the art and suitable catalysts include sulfided NiMo or sulfided CoMo on oxidic support. Examples of oxidic supports include alumina, silica, titania, silica-alumina. A preferred catalyst for hydrodesulfurisation of the feed is a sulfided CoMo supported on alumina support. The HDS reactor may be operated at temperatures that are lower than those in the hydropyrolysis reactor, to avoid formation of aromatics in this reactor. Such sulfur removal may also result in partial oxygen removal.

Further, a gas clean-up system may be used to remove sulfur in the form of $H_2S$ from the product of hydropyrolysis and HDS steps. This may be achieved, for example, by contacting the stream with a sulfur guard bed. Suitable materials for such a sulfur guard bed include highly dispersed metals or metal oxides on an oxidic support. Examples of metal oxides suitable as guard bed include zinc oxide and iron oxide. Examples of oxidic support include silica, alumina, and mixed silica-alumina. Suitable metals dispersed on oxidic support include nickel, iron, and copper. Suitable metal oxides dispersed on oxidic support include iron oxide, zinc oxide and cupric oxide. Suitable loadings of active metal or metal oxide on the support range from 2 wt % to 70 wt % based on calcined, oxidic form of the guard bed material.

Hydroconversion and Aromatic Saturation

After removal of the char and cooling, the deoxygenated hydrocarbon product together with the $H_2$, CO, $CO_2$, $H_2O$, and $C_1$-$C_3$ gases from the hydropyrolysis step are contacted with one or more catalyst composition suitable for the aromatic saturation of the deoxygenated hydrocarbon product in a hydroconversion reactor.

The hydroconversion step may be carried out in situ. In an alternative embodiment, by virtue of the high stability of the deoxygenated hydrocarbon product, for example being superior to conventional bio-oils, said hydrocarbon product may be stored for an extended period and/or may be transported to a remote location before being subjected to a hydroconversion step as described herein.

The hydroconversion step is suitably carried out at a temperature in the range of from 100° C. to 300° C. and a pressure in the range of from 0.50 MPa to 7.50 MPa. The weight hourly space velocity (WHSV) for this step is in the range of about 0.1 $h^{-1}$ to about 2 $h^{-1}$.

The hydroconversion reactor may comprise one or more reactor vessels and/or one or more reaction zones within a reactor vessel. Each reactor vessel and/or reaction zone may operate under different reaction conditions, e.g. temperature and pressure. Preferably, the hydroconversion reactor is a single reactor vessel.

The catalyst compositions used in this step are protected from Na, K, Ca, P, and other metals present in the biomass which may otherwise poison the catalyst, since these metals are predominantly removed with the char and ash products of the first hydropyrolysis stage, which are separated from the partially deoxygenated hydropyrolysis product, prior to subjecting this product to hydroconversion. Further, the catalyst compositions used in this step are protected from sulfur either due to the use of the non-sulfided catalyst in the hydropyrolysis step or due to the use of the sulfur removal step, or both.

In one embodiment of the invention, the catalyst composition present in the hydroconversion reactor preferably comprise one or more active metals selected from base (i.e. non-noble) metals comprising of cobalt, molybdenum, nickel and tungsten.

In this embodiment, the metals present in the catalyst composition present in the hydroconversion reactor are supported, preferably on an oxide support. Oxide supports useful as supports for the catalyst composition present in the hydroconversion reactor include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalised fines of spent hydrotreating catalysts (e.g. fines of CoMo on oxidic supports, NiMo on oxidic supports and fines of hydrocracking catalysts containing NiW on a mixture of oxidic carriers and zeolites). Another class of materials suitable as support includes carbon-based materials, including activated carbon, ordered mesoporous carbon and disordered or worm-hole like mesoporous carbons.

Further, in this embodiment of the invention, the catalyst composition may be provided to the hydroconversion reactor in either an oxidic state or in a pre-reduced state.

Therefore, after preparation by one of the above or another method, the compositions thus-formed are suitably calcined in the presence of air or oxygen in order to obtain the oxidic state. By the term 'oxidic state' as used herein is meant that 95% or more of the active metal atoms present are present in an oxidation state greater than zero as oxides. For example, a supported oxidic cobalt catalyst has more than 95% of the cobalt present in the +2 or +3 oxidation state, as oxides, and a supported oxidic nickel catalyst has more than 95% of the nickel present in the +2 oxidation state, as oxide.

Alternatively, after preparation by one of the above or another method, the compositions thus-formed are suitably subjected to a reduction step in order to convert at least a portion of the active metals into their fully reduced state. This can be carried out by subjecting the catalyst to a reducing gas (for example, gas containing hydrogen) at elevated temperatures and elevated pressures. The temperatures of the reduction step can vary from 120° C. to 450° C. and pressures can vary from 0.1 megapascal to 10 megapascal.

It will be readily apparent that, although the catalyst composition provided in the hydroconversion reactor will initially comprise metal or metals in their oxidic or reduced states, the chemical form of the catalyst composition will undergo a change under the operating environment of the process, resulting in a change in the chemical form of the active metals on the catalyst and of the support as well. This change will involve phenomena resulting from the interaction of the catalyst with the reactant gas (hydrogen, carbon monoxide, carbon dioxide), products (hydrocarbons) and by-products (water, carbon monoxide, carbon dioxide, ammonia, traces of hydrogen sulfide, etc.) under the temperature and pressure conditions of the process.

It is postulated, without wishing to be bound by theory, that the initial chemical composition will be transformed under the conditions of the process of the invention into a composition where a portion of the active metals may be in reduced form (with an oxidation number of zero), and another portion of the active metals may be in a higher oxidation state in oxidic form (with oxygen atoms available from the biomass feedstock or from the catalyst itself). A small amount of the active metals may also be present in sulfided form due to trace amounts of sulfur present in the hydroconversion reactor.

In an alternative embodiment of the invention, the catalyst composition present in the hydroconversion reactor preferably comprise one or more active metals selected from platinum group metals (ruthenium, rhodium, palladium, osmium, iridium, and platinum) and supported on an oxide support. Examples of oxide supports suitable for the catalyst composition of this embodiment include alumina, silica, titania, ceria, zirconia, as well as binary oxides such as silica-alumina, silica-titania and ceria-zirconia. Another class of materials suitable as catalyst support includes carbon-based materials, including activated carbons, ordered mesoporous carbons and disordered or worm-hole like mesoporous carbons. Preferred supports include alumina, silica and silica-alumina, and most preferred support is silica-alumina.

For either embodiment of the invention, with respect to the catalyst compositions present in the hydroconversion reactor, total metal loadings on the catalyst compositions present in the hydroconversion reactor are preferably in the range of from 0.05 wt % to 3 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Also in either embodiment, additional elements such as one or more of phosphorous, boron and nickel may be incorporated into the hydrodeoxygenation catalyst composition in order to improve the dispersion of the active metal.

The catalyst composition used in the hydroconversion reactor in the process of the present invention may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The catalyst compositions present in the hydroconversion reactor are preferably present as extrudate catalyst particles. Any suitable extrudate shape, e.g. cylinders, trilobes, tetralobes, may be used.

Catalyst particles sizes, for use in a commercial reactor in the hydroconversion step, comprising hydrodeoxygenation and aromatic saturation are preferably of a nominal diameter in the range of from 0.3 mm to 4.0 mm, more preferably in the range of from 0.6 mm to 3.0 mm, and most preferably in the range of from 1 mm to 2.4 mm. Suitable lengths of the extrudate catalyst particles are in the range of from 3 to 6 mm.

In a preferred embodiment of the invention, more than one catalyst composition is present in the hydroconversion reactor. In this embodiment, it is preferred that one of the catalyst compositions present in the hydroconversion vessel comprises one or more active metals selected from base (i.e. non-noble) metals comprising of cobalt, molybdenum, nickel and tungsten and one of the catalyst compositions present in the hydroconversion vessel comprises one or more active metals selected from platinum group metals (ruthenium, rhodium, palladium, osmium, iridium, and platinum) and supported on an oxide support.

In this embodiment, the catalyst compositions may be present as a mixed bed of catalyst particles. However preferably, a stacked bed catalyst system is used wherein the catalyst compositions are present as separate catalyst beds. Preferably, the stacked beds are ordered such that the reactants are contacted firstly with a bed comprising a catalyst composition comprising one or more active metals selected from base (i.e. non-noble) metals comprising of cobalt, molybdenum, nickel and tungsten and then with a bed comprising a catalyst composition comprising one or more active metals selected from platinum group metals (ruthenium, rhodium, palladium, osmium, iridium, and platinum) and supported on an oxide support as they pass through the reactor.

In the embodiment of the invention wherein more than one catalyst composition is present in the hydroconversion reactor different amounts of each catalyst composition may be suitable. In a preferred embodiment of the invention, wherein both a catalyst composition comprising one or more active metals selected from base (i.e. non-noble) metals comprising of cobalt, molybdenum, nickel and tungsten and a catalyst composition comprising one or more active metals selected from platinum group metals (ruthenium, rhodium, palladium, osmium, iridium, and platinum) and supported on an oxide support, the catalyst composition comprising one or more active metals selected from base (i.e. non-noble) metals comprising of cobalt, molybdenum, nickel and tungsten may be present in any proportion. However, preferably it is present in no more than 70 wt %, more preferably no more than 50 wt %, even more preferably no more than 30 wt % of the overall amount of catalyst composition present in the hydroconversion catalyst reactor. In this embodiment of the invention, the catalyst composition comprising one or more active metals selected from platinum group metals (ruthenium, rhodium, palladium, osmium, iridium, and platinum) and supported on an oxide support may be present in any proportion. However, preferably it is present as at least 30 wt %, preferably, at least than 50 wt %, even more preferably at least 70 wt % of the overall amount of catalyst composition present in the hydroconversion catalyst reactor.

The hydroconversion reactor is preferably a fixed bed reactor operating in either a down-flow or up-flow, preferably down-flow, mode of operation. Depending on the physical state of the feed to this reactor, it may operate under a trickle flow or a gas flow regime.

While the one or more catalyst composition present in the hydroconversion reactor are suitable for the aromatic saturation of the deoxygenated hydrocarbon product, it will be readily understood that said catalyst compositions may be capable of catalysing other chemical reactions under the conditions in the hydroconversion reactor, for example the removal of heteroatoms, such as oxygen, sulfur and nitrogen.

After the hydroconversion step, the vapour phase product of step d) may be condensed to provide a liquid phase product comprising substantially fully deoxygenated C4+ hydrocarbon liquid and aqueous material. The remaining vapour phase suitably comprises mainly $H_2$, CO, $CO_2$ and light hydrocarbon gases (typically $C_1$ to $C_3$ but this stream may also contain some $C_{4+}$ hydrocarbons) and may be separated.

This remaining vapour phase may be optionally sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product is then separated in order to remove the aqueous material, suitably by phase separation, and to provide the hydrocarbon product in the form of a deoxygenated hydrocarbon liquid.

The liquid deoxygenated hydrocarbon product herein preferably comprises no more than 5 wt %, more preferably no more than 1 wt % of the oxygen present in the original biomass-containing and/or biomass-derived feedstock. The liquid deoxygenated hydrocarbon product contains less than 2 wt %, preferably less than 1 wt %, and most preferably less than 0.1 wt % oxygen.

Suitably, the liquid deoxygenated hydrocarbon product is then subjected to further separation and purification steps in order to provide desirable products.

In one embodiment of the invention, the liquid deoxygenated hydrocarbon product is subjected to distillation in order to separate the liquid deoxygenated hydrocarbon product into $C_{4+}$ fractions according to ranges of the boiling points of the liquid products contained therein.

The liquid deoxygenated hydrocarbon product comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (FBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 10 wt % of total C4+ hydrocarbons, preferably less than 3 wt % of total C4+ hydrocarbons and most preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the liquid deoxygenated hydrocarbon product produced from the biomass-containing and/or biomass-derived feedstock, may be substantially fully free from oxygen, sulfur and nitrogen and have low content of aromatic compounds. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw. The aromatics content is preferably less than 10 wt %, more preferably less than 7 wt %, even more preferably less than 5 wt %.

Detailed Description of the Drawings

FIG. 1 shows an embodiment of a prior art hydropyrolysis/hydroconversion process.

Feedstock 1 containing the lignocellulosic material is contacted with a hydrogen-containing gaseous stream 2 in hydropyrolysis reactor vessel 3. The product 4 of this reactor vessel is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 5 separates char, ash and catalyst fines 6 from the vapour phase product stream 7. The vapour phase product stream 7 then enters the catalytic hydroconversion reactor 8. This reactor 8 is a fixed bed reactor. The product 9 of this reactor contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 10 downstream of the catalytic hydroconversion reactor 8 and a liquid product 21 is recovered. The non-condensable gases 11 are sent to a gas clean-up system, comprising a vapour phase hydrodesulfurisation reactor 12, an $H_2S$ removal unit 13 to remove a $H_2S$ stream 14 and an ammonia removal unit 15 to remove an ammonia stream 16 as by-products of the process. The remaining stream containing light hydrocarbons 17 is sent to a separation, reforming and water-gas shift section 18 of the process, where hydrogen 19 is produced from the light gases and renewable $CO_2$ is discharged as a by-product of the process 20. A fuel gas stream may be recovered as a by-product from this section as well.

The condensibles 21 recovered from the condensation and gas-liquid separation system 10 are sent to a liquid/liquid separator 23, where the aqueous product 22 is separated from the hydrocarbon liquid product 24. The hydrocarbon liquid product 24 is then sent for distillation 25 to recover gasoline product 26 and a middle-distillate product 27. If desired, kerosene/jet fuel and diesel may be recovered as separate streams from the distillation tower.

Figure 2:
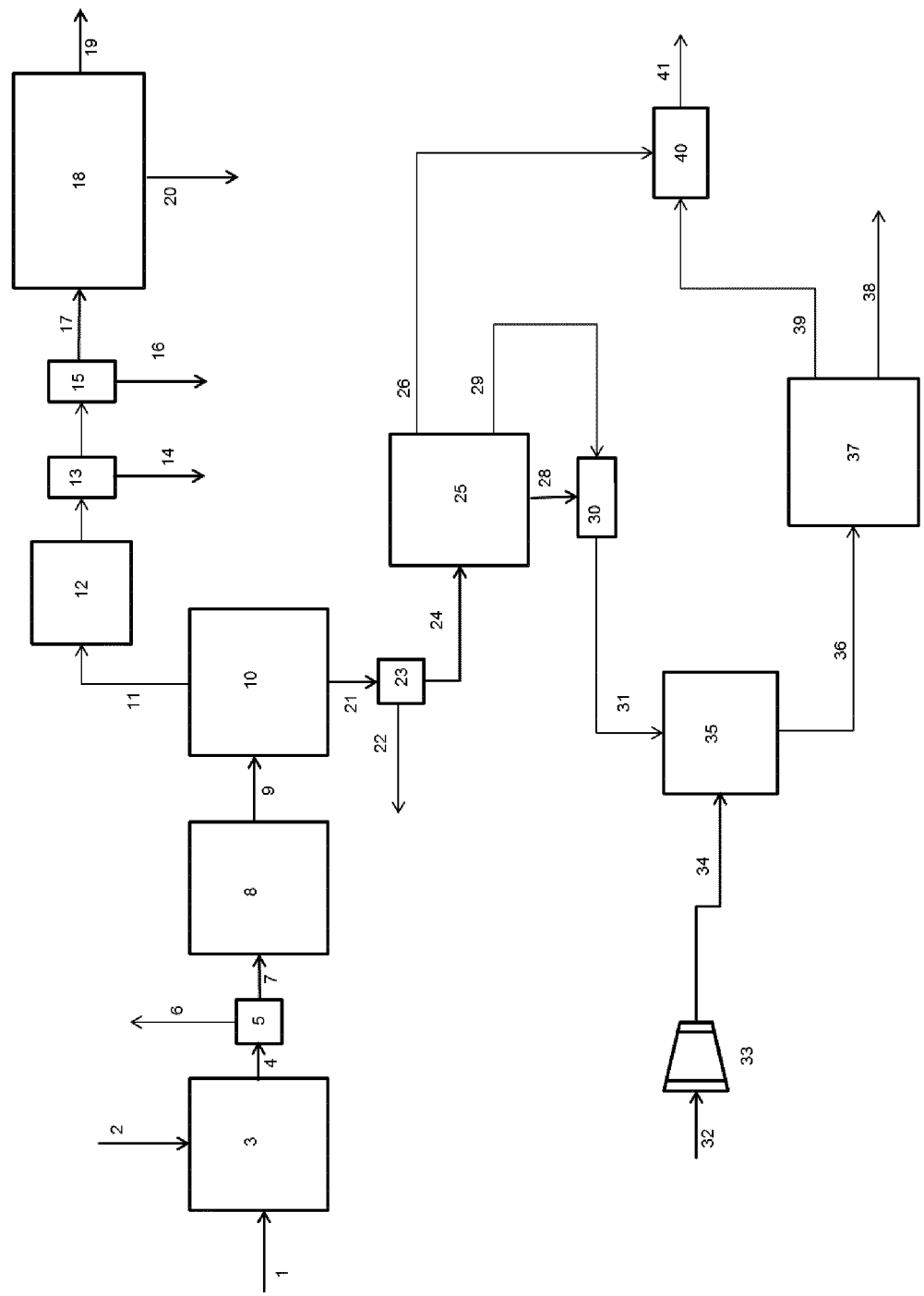

FIG. 2 exemplifies a prior art hydropyrolysis/hydroconversion process with extra upgrading steps, such as described in WO 2015/114008. The embodiment shown in FIG. 2 includes the same steps as the embodiment of the prior art shown in FIG. 1. However, an additional fixed-bed hydrogenation reactor 35 is used for upgrading the middle distillate fraction 28 recovered by the distillation of the hydrocarbon product 24 of the hydroconversion reactor 8. A pump 30 is used to provide a stream 31 comprising the middle distillate stream and a C6 stream rich in benzene 29 from the distillation 25, to the reactor 35. A stream of hydrogen 32 is compressed in a compressor 33 in order to provide a hydrogen stream 34 at a pressure that is similar to or higher than the pressure at which the hydropyrolysis and hydroconversion reactors (3, 8) operate. The stream 31 is pumped into the reactor 35 and processed over a hydrogenation (or hydrogenation & ring opening) catalyst system to produce an upgraded product stream 36.

The upgraded product stream 36 is subjected to further distillation 37 to provide an upgraded middle distillate product 38 and a C6 stream with reduced benzene 39. This C6 stream can be provided to a mixer 40 and mixed therein with the gasoline product 26 from distillation 25 in order to provide an upgraded gasoline stream 41.

Figure 3:
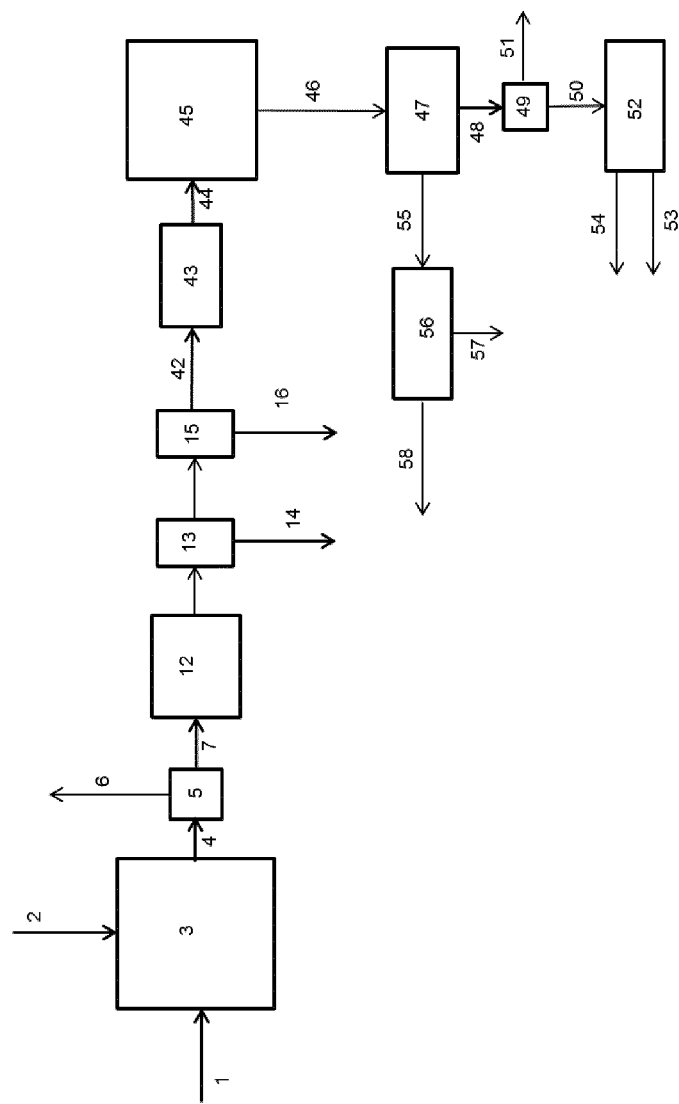
FIGS. 3 and 4 show non-limiting representations of embodiments of the process of the invention.

FIG. 3 exemplifies one non-limiting embodiment of the invention described herein. In this embodiment, the vapour phase product 7 from the solid separator 5 is subjected to a clean-up system, comprising a vapour phase hydrodesulfurisation reactor 12, an $H_2S$ removal unit 13 to remove a $H_2S$ stream 14 and an ammonia removal unit 15 to remove an ammonia stream 16 as by-products of the process. The resultant gaseous stream 42 is then cooled in cooler 43 and a gaseous cooled stream 44 is provided to a fixed bed reactor 45. Fixed bed reactor 45 contains one or more catalyst compositions suitable for hydrodeoxygenation and aromatic saturation of the partially deoxygenated hydrocarbon product.

The vapour product stream 46 from reactor 45 is condensed in condenser and gas-liquid separator 47 downstream of the reactor 45 and a liquid product 48 is recovered.

Liquid product 48 is sent to a liquid/liquid separator 49, where the aqueous product 51 is separated from the hydrocarbon liquid product 50. The hydrocarbon liquid product 50 is then sent for distillation 52 to recover gasoline product 54 and a middle-distillate product 53. If desired, kerosene/jet fuel and diesel may be recovered as separate streams from the distillation tower.

The non-condensable gases 55 are sent to a separation, reforming and water-gas shift section 56 of the process, where hydrogen 58 is produced from the light gases and renewable $CO_2$ is discharged as a by-product 57 of the process.

Figure 4:
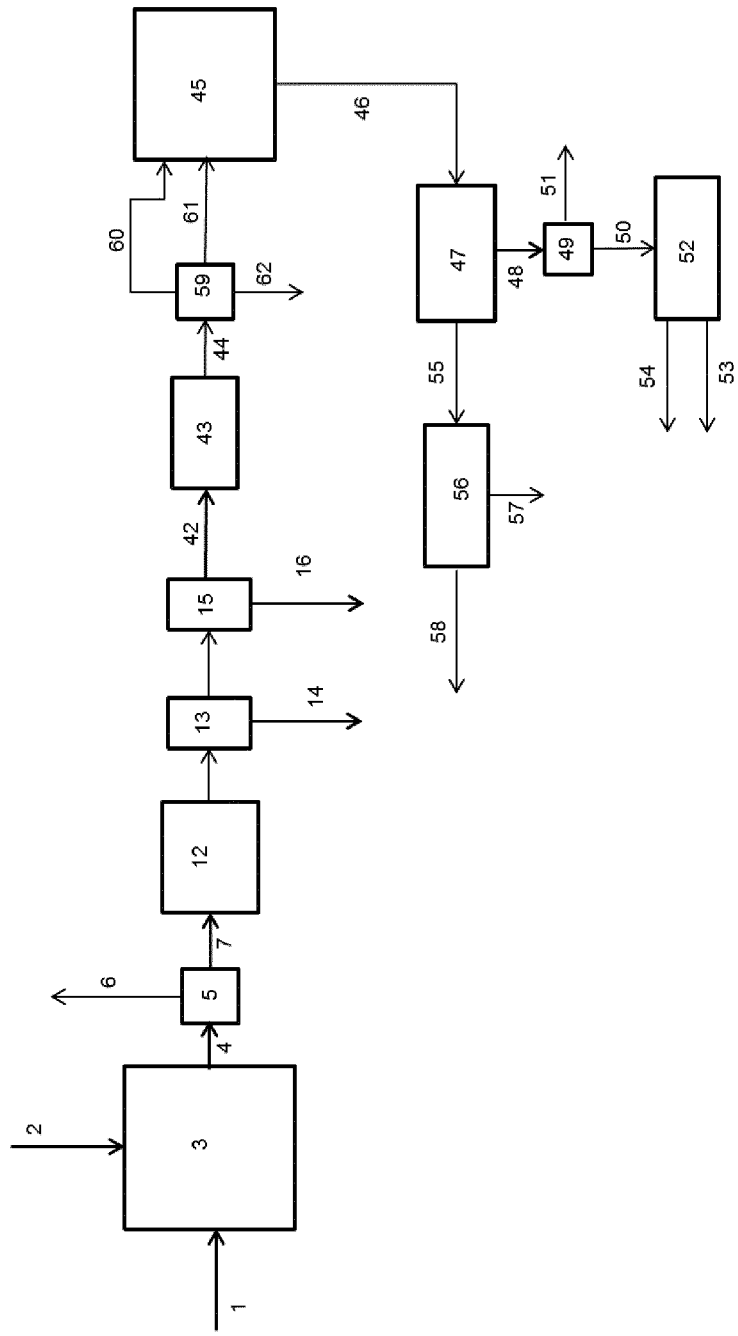
Figure 5:
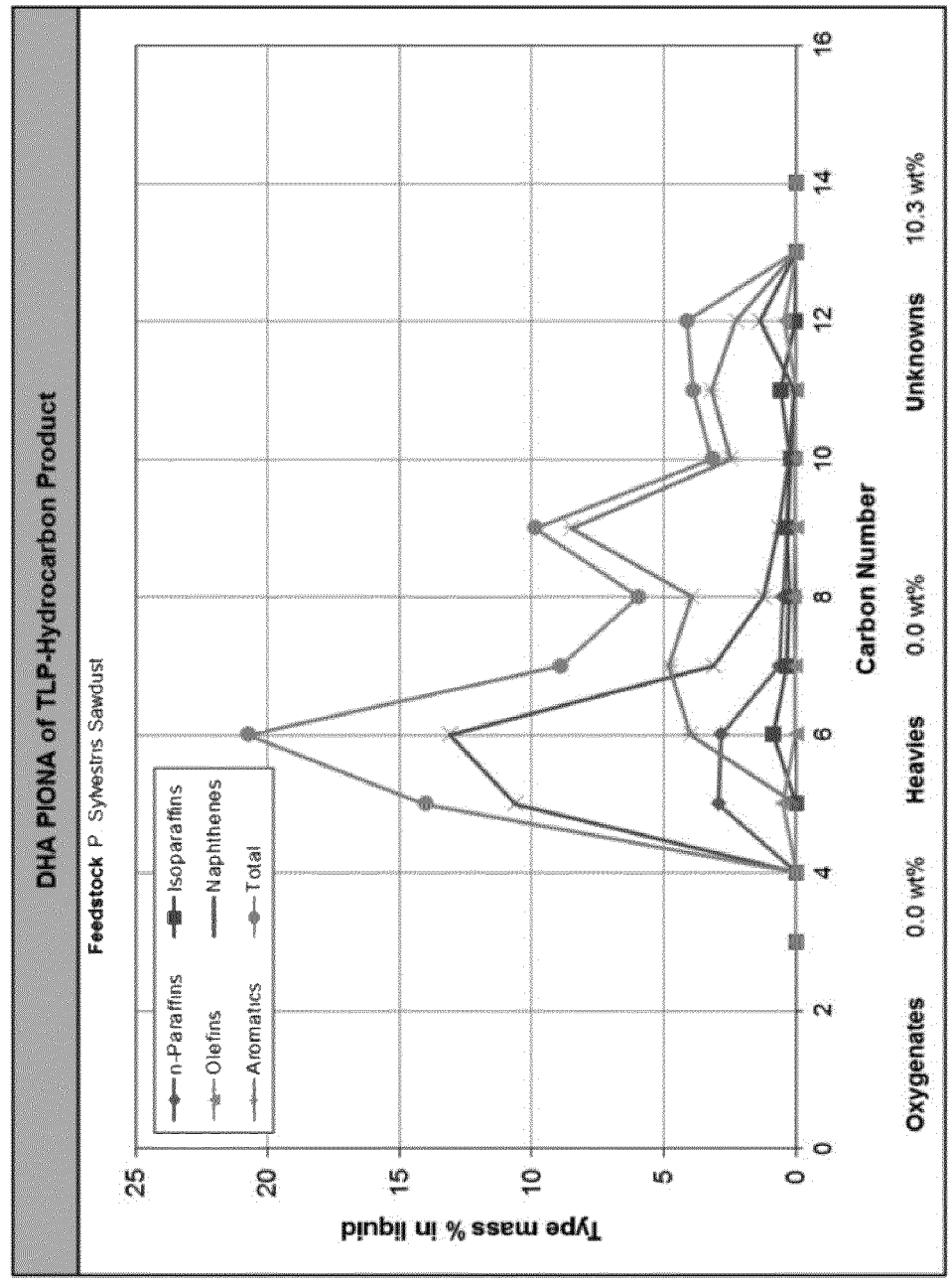
FIGS. 5 to 10 show the results of the examples described herein.
Figure 6:
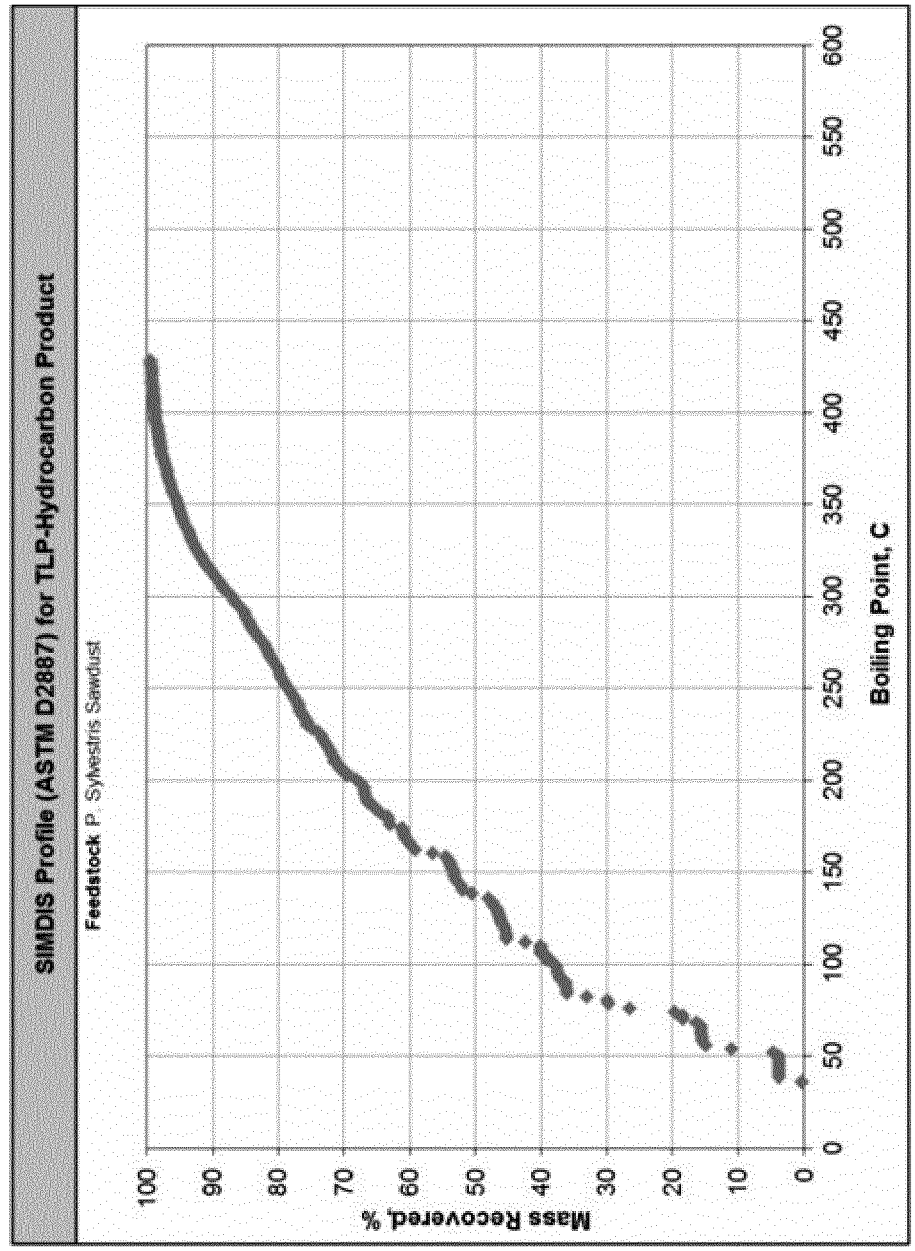
Figure 7:
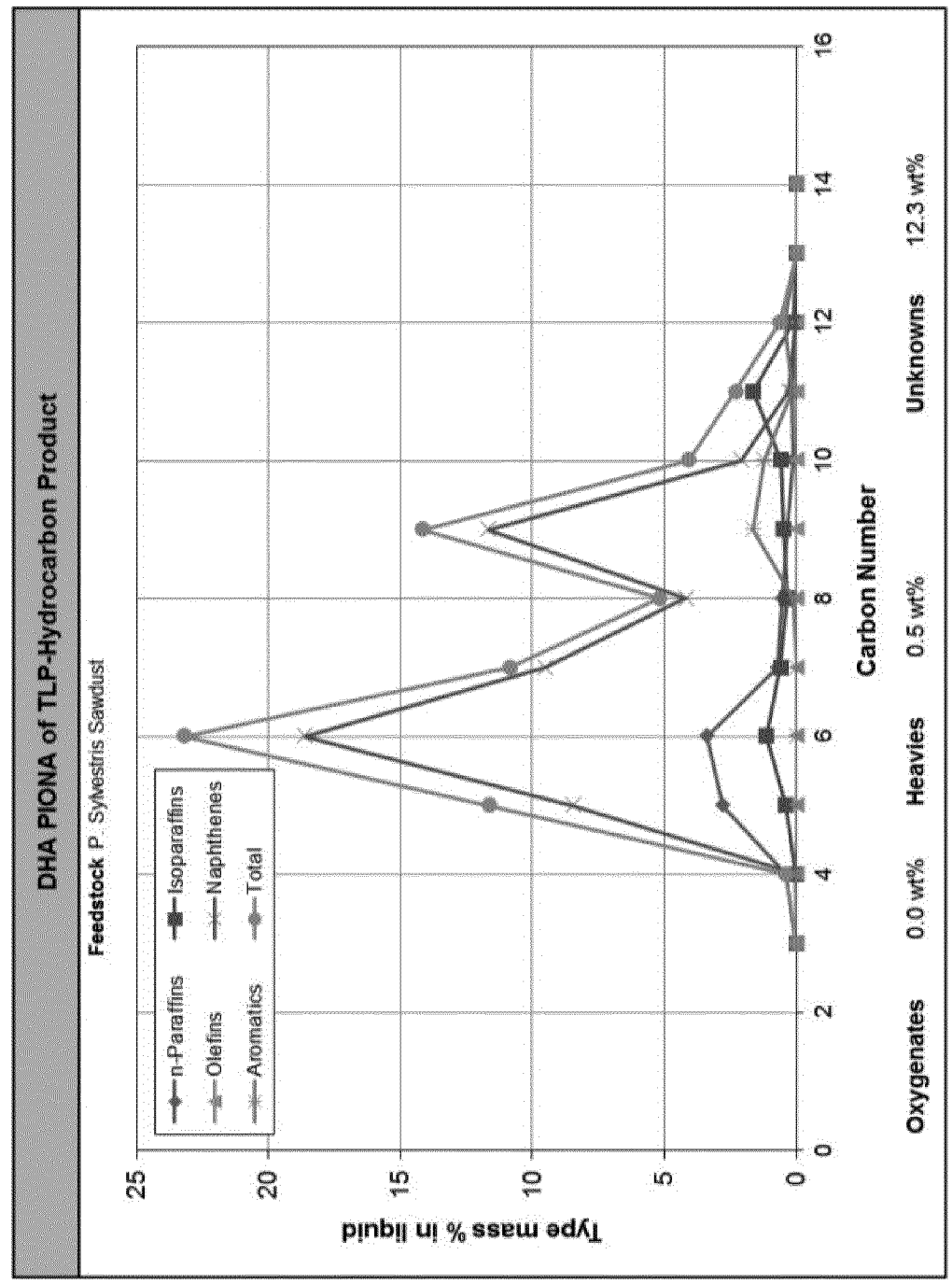
Figure 8:
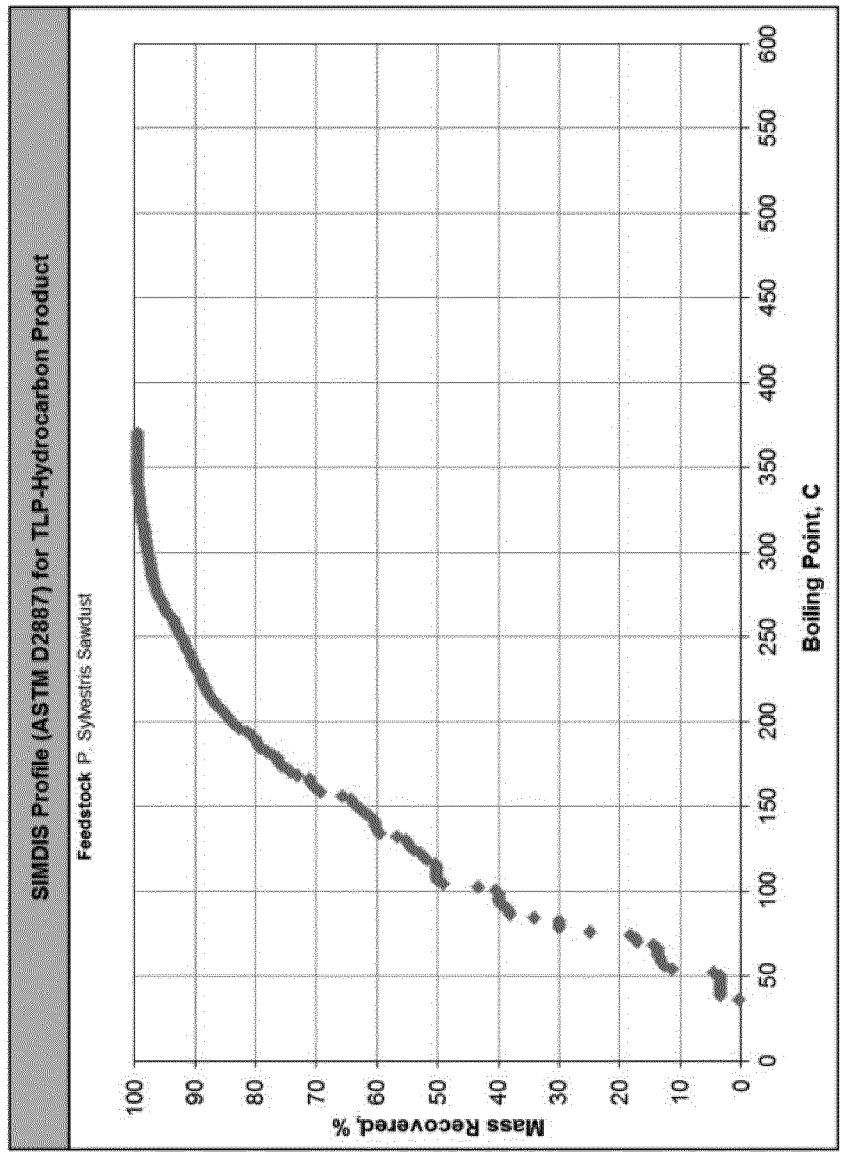
Figure 9:
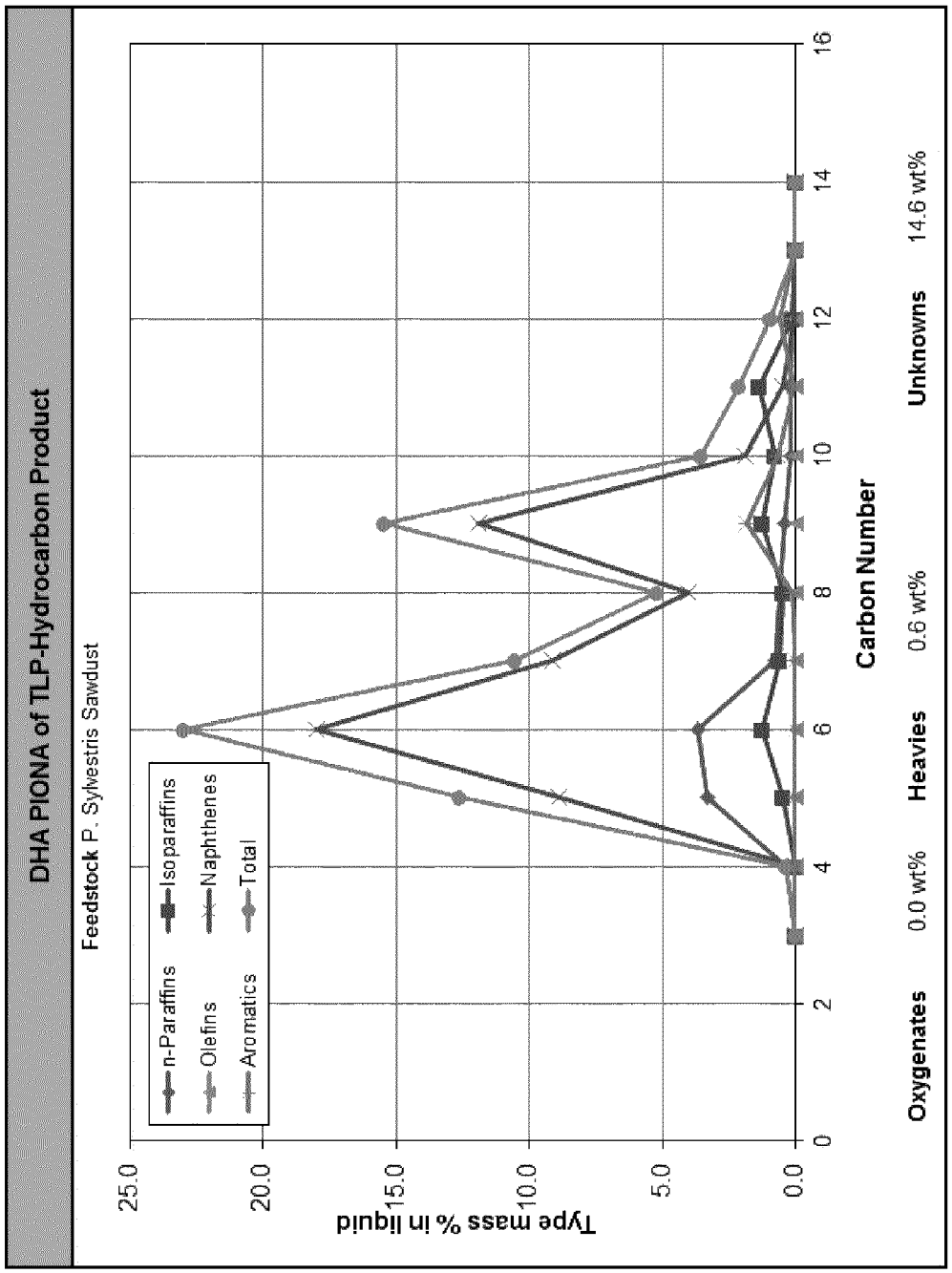
Figure 10:
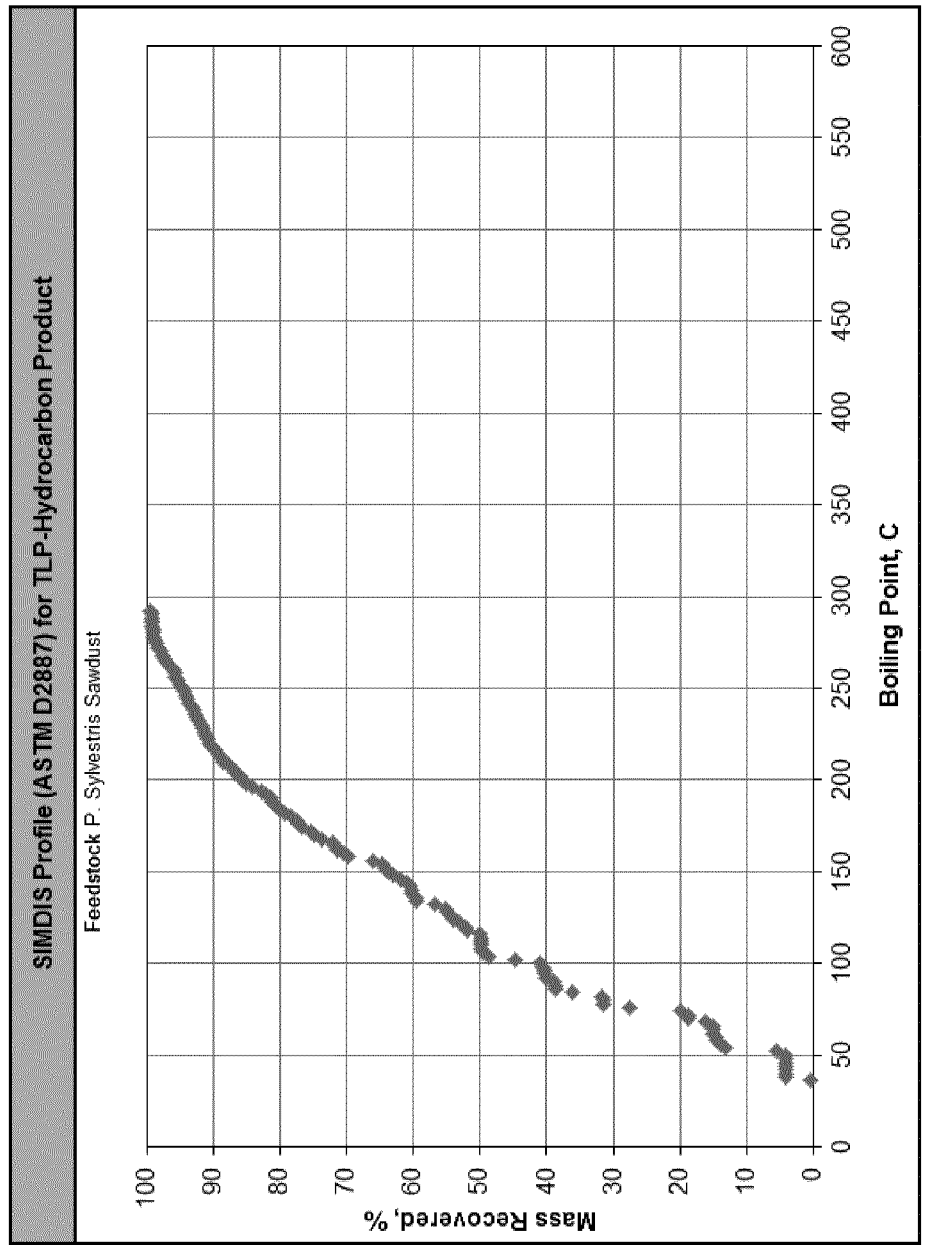

A further non-limiting embodiment of the present invention is shown in FIG. 4. In this embodiment, cooling of stream 42 in cooler 43 results in a cooled stream 44 containing condensed materials. The cooled stream 44 is then separated in three-phase separator 59 to separate a condensed aqueous stream 62, a condensed organics stream 61 and a gaseous stream 60. Both the condensed organics stream 61 and gaseous stream 60 are provided to the fixed bed reactor 45, which operates in this embodiment as a trickle-flow reactor.

FIGS. 5 to 10 show the results of the examples described herein.

EXAMPLES

The invention will now be illustrated by means of the following Examples, which are not intended to limit the invention.

Example 1 (Comparative)

S-4211 catalyst (a cobalt/molybdenum catalyst commercially available from CRI Catalyst Co) was crushed and sieved to a particle size range of 300 μm to 500 μm. The catalyst was subjected to an ex-situ sulfidation procedure to convert the cobalt and molybdenum metals to their sulfide forms. 210 g of this catalyst was used as the catalyst in the first, bubbling fluidised bed, hydropyrolysis reactor.

S-4212 catalyst (a nickel/molybdenum catalyst commercially available from CRI Catalyst Co) was subjected to an in-situ sulfidation step to convert the nickel and molybdenum metals to their sulphide forms. In the second, fixed bed reactor, 705 g of sulfided S-4212 catalyst was loaded in the form of extrudates of nominally 1.3 mm diameter and approximately 3 mm to 6 mm length.

The solid feedstock used was sawdust of *Pinus sylvestris* ground and sieved to a particle size of less than 500 μm. The catalyst in the first, bubbling fluidised reactor was fluidised with a stream of hydrogen pre-heated to a temperature of approximately 435° C. After the first stage catalyst had been fluidised, the biomass was introduced into the reactor and processed in a continuous manner. The rate of processing of biomass was approximately 4.42 g/min on moisture and ash-free basis during the experiment. This feed rate corresponds to a weight hourly space velocity of approximately 1.26 kg biomass fed per kg catalyst per hour (on a moisture and ash-free basis). Over the duration of biomass processing, the weighted average temperature of the fluidised bed of catalyst was 443.7° C. The biomass feedstock was converted to a mixture of char, ash and vapours in the first, hydropyrolysis stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a hot filtration set-up and the vapours were sent to the second stage fixed bed reactor. The average temperature of the second stage catalyst during the experiment was maintained at 410.5° C. The average weight hourly space velocity for the second stage was 0.38 kg biomass fed per kg catalyst per hour (on a moisture and ash-free basis). Operating pressure for both the first and the second stages was 2.25 MPa(gauge).

The vapour phase product of the second stage was cooled in stages to −41.8° C. and a two-layer liquid product containing a hydrocarbon layer floating on an aqueous layer was recovered. The hydrocarbon liquid was separated from the aqueous liquid, and was analysed. The off-gas from the process was sent to an online gas chromatogram, and the composition of the gas was analysed throughout the run. The mass balance and carbon balance of the process was calculated from the mass and analysis of the liquid products and compositional information of the gas product, based on which the yield profile was calculated.

It was found that the hydrocarbon liquid product had a very low oxygen content (essentially below the detection limit of the instrument of 0.01 wt %), and the aqueous product produced contained only 0.03 wt % carbon. Thus, complete hydrodeoxygenation of the biomass was achieved producing an oxygen-free hydrocarbon product, and a carbon-free aqueous phase. The total acid number of the hydrocarbon product was found to be very low, less than 0.1 mg KOH/g.

The hydrocarbon and aqueous phases were subjected to further analysis. The detailed hydrocarbon analysis (DHA) of the hydrocarbon product (FIG. 5) showed this product to be comprising predominantly of cyclic species. Among the cyclic species, naphthenes were found to dominate in the low carbon number range (carbon numbers of 7 and lower), while aromatics dominated at higher carbon number range (carbon numbers of 8 and above). Paraffins and isoparaffins were present mainly in the low carbon number molecules (carbon numbers of 7 and lower). 6-carbon molecules were the most abundant molecules in the liquid product.

SIMDIS of the hydrocarbon product (FIG. 6) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 26.6 wt % of the feedstock weight on a moisture and ash-free basis. Further details are mentioned in Tables 1 to 8.

The aromatic content of the total liquid product (TLP) was also measured using IP-391 analytical method. This method showed the product to contain about 53.6 wt % aromatics, with the contribution of monoaromatics at 41.4 wt % of the total liquid, that of diaromatics at 7.4 wt % of the total liquid, and that of tri+ aromatics at 4.8 wt % of the total liquid.

Example 2 (Inventive)

S-4261 catalyst (a cobalt/molybdenum catalyst commercially available from CRI Catalyst Co) was crushed and sieved to a particle size range of 300 μm to 500 μm. 200 g of this catalyst was used as the catalyst in the first, bubbling fluidised bed, hydropyrolysis reactor. In the second, fixed bed reactor, a stacked bed of two different catalyst systems, comprising of S-4252 catalyst (a cobalt/molybdenum catalyst available from CRI Catalyst Co) at the top and S-4213 catalyst (a Pt/Pd based hydrogenation catalyst available from CRI Catalyst Co) at the bottom was used. The weight ratio of the two catalysts was 1:3, and the total mass of catalyst loaded was 520 g. The catalysts in the second, fixed bed, were loaded in the form of extrudates of nominally 1.3 mm diameter and approximately 3 mm to 6 mm length. Prior to introducing the biomass in the unit, the stacked bed catalyst system in the second, fixed bed reactor, was reduced under flowing hydrogen at a pressure of approximately 2.25 MPa and a temperature of approximately 400° C.

The solid feedstock used was sawdust of *Pinus sylvestris* ground and sieved to a particle size of 250 μm to 500 μm. The catalyst in the first, bubbling fluidised reactor was fluidised with a stream of hydrogen pre-heated to a temperature of approximately 435° C. After the first stage catalyst had been fluidised, the biomass was introduced into the reactor and processed in a continuous manner. The rate of processing of biomass was approximately 3.19 g/min on moisture and ash-free basis during the experiment. This feed rate corresponds to a weight hourly space velocity of approximately 0.94 kg biomass fed per kg catalyst per hour (on a moisture and ash-free basis). Over the duration of biomass processing, the weighted average temperature of the fluidised bed of catalyst was 441.8° C. The biomass feedstock was converted to a mixture of char, ash and vapours in the first, hydropyrolysis stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a hot filtration set-up and the vapours were sent to the second stage, a fixed bed reactor. Between the char filtration set-up and the second stage, the vapours were allowed to cool, and the average temperature of the second stage catalyst during the experiment was maintained at 215.9° C. The average weight hourly space velocity for the second stage was 0.36 kg biomass fed per kg catalyst per hour (on a moisture and ash-free basis). Operating pressure for both the first and the second stages was 2.24 MPa (gauge).

The vapour phase product of the second stage was cooled in stages to −40.2° C. and a two-layer liquid product containing a hydrocarbon layer floating on an aqueous layer was recovered. The hydrocarbon liquid was separated from the aqueous liquid, and was analyzed. The off-gas from the process was sent to an online gas chromatogram, and the composition of the gas was analyzed throughout the run. The mass balance and carbon balance of the process was calculated from the mass and analysis of the liquid products and compositional information of the gas product, based on which the yield profile was calculated.

It was found that the hydrocarbon liquid product had a very low oxygen content (about 0.01 wt %), and the aqueous product produced contained only 0.02 wt % carbon. Thus, complete hydrodeoxygenation of the biomass was achieved producing an oxygen-free hydrocarbon product, and a carbon-free aqueous phase. The total acid number of the hydrocarbon product was found to be very low, at 0.012 mg KOH/g.

The hydrocarbon and aqueous phases were subjected to further analysis. The detailed hydrocarbon analysis (DHA) of the hydrocarbon product (FIG. 7) showed this product to be comprising predominantly of naphthenes, followed by paraffins (n- and iso-). 6-carbon molecules were the most abundant molecules in the liquid product. SIMDIS of the hydrocarbon product (FIG. 8) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 23.5 wt % of the feedstock weight on a moisture and ash-free basis. Further details are mentioned in Tables 1 to 8.

The aromatic content of the total liquid product (TLP) was measured using IP-391 analytical method. This method showed the product to have a very low aromatic content. The monoaromatic, diaromatic and tri+aromatic content was each below 0.1 wt %, the detection limit of the method. The total aromatic content in the total liquid product in this inventive process scheme (<0.3 wt %) was thus significantly lower than that in the comparative process scheme of Example-1 (53.6 wt %).

Example 3 (Inventive)

S-4261 catalyst (a cobalt/molybdenum catalyst commercially available from CRI Catalyst Co) was crushed and sieved to a particle size range of 300 μm to 500 μm. 275 g of this catalyst was used as the catalyst in the first, bubbling fluidised bed, hydropyrolysis reactor. In the second, fixed bed reactor, a stacked bed of two different catalyst systems, comprising of S-4252 catalyst (a cobalt/molybdenum catalyst available from CRI Catalyst Co) at the top and S-4213 catalyst (a Pt/Pd based hydrogenation catalyst available from CRI Catalyst Co) at the bottom was used. The weight ratio of the two catalysts was 1:3, and the total mass of catalyst loaded was 520 g. The catalysts in the second, fixed bed, were loaded in the form of extrudates of nominally 1.3 mm diameter and approximately 3 mm to 6 mm length. Prior to introducing the biomass in the unit, the stacked bed catalyst system in the second, fixed bed reactor, was reduced under flowing hydrogen at a pressure of approximately 2.25 MPa and a temperature of approximately 400° C.

The solid feedstock used was sawdust of *Pinus sylvestris* ground and sieved to a particle size of 250 μm to 500 μm. The catalyst in the first, bubbling fluidised reactor was fluidised with a stream of hydrogen pre-heated to a temperature of approximately 435° C. After the first stage catalyst had been fluidised, the biomass was introduced into the reactor and processed in a continuous manner. The rate of processing of biomass was approximately 3.69 g/min on moisture and ash-free basis during the experiment. This feed rate corresponds to a weight hourly space velocity of approximately 0.80 kg biomass fed per kg catalyst per hour (on a moisture and ash-free basis). Over the duration of biomass processing, the weighted average temperature of the fluidised bed of catalyst was 433.3° C. The biomass feedstock was converted to a mixture of char, ash and vapours in the first, hydropyrolysis stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a hot filtration set-up and the vapours were sent to the second stage, a fixed bed reactor. Between the char filtration set-up and the second stage, the vapours were allowed to cool, and the average temperature of the second stage catalyst during the experiment was maintained at 193.7° C. The average weight hourly space velocity for the second stage was 0.43 kg biomass fed per kg catalyst per hour (on a moisture and ash-free basis). Operating pressure for both the first and the second stages was 2.7 MPa(gauge).

The vapour phase product of the second stage was cooled in stages to −43° C. and a two-layer liquid product containing a hydrocarbon layer floating on an aqueous layer was recovered. The hydrocarbon liquid was separated from the aqueous liquid, and was analyzed. The off-gas from the process was sent to an online gas chromatogram, and the composition of the gas was analyzed throughout the run. The mass balance and carbon balance of the process was calculated from the mass and analysis of the liquid products and compositional information of the gas product, based on which the yield profile was calculated.

It was found that the hydrocarbon liquid product had a very low oxygen content (near the lower detection limit of the instrument at about 0.01 wt %), and the aqueous product produced contained only 0.01 wt % carbon (also near the lower detection limit of the instrument). Thus, complete hydrodeoxygenation of the biomass was achieved producing an oxygen-free hydrocarbon product, and a carbon-free aqueous phase. The total acid number of the hydrocarbon product was found to be very low, below 0.01 mg KOH/g.

The hydrocarbon and aqueous phases were subjected to further analysis. The detailed hydrocarbon analysis (DHA) of the hydrocarbon product (FIG. 9) showed this product to be comprising predominantly of naphthenes, followed by paraffins (n- and iso-). 6-carbon molecules were the most abundant molecules in the liquid product. SIMDIS of the hydrocarbon product (FIG. 10) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 24.9 wt % of the feedstock weight on a moisture and ash-free basis. Further details are mentioned in Tables 1 to 8.

The aromatic content of the total liquid product (TLP) was measured using IP-391 analytical method. This method showed the product to have a very low aromatic content. The monoaromatic, diaromatic and tri+aromatic content was each below 0.1 wt %, the detection limit of the method. The total aromatic content in the total liquid product in this inventive process scheme (<0.3 wt %) was thus significantly lower than that in the comparative process scheme of Example-1 (53.6 wt %).

TABLE 1

|  | Example-1 | Example-2 | Example-3 |
|---|---|---|---|
| Feedstock | Pinus sylvestris sawdust | Pinus sylvestris sawdust | Pinus sylvestris sawdust |
| 1$^{st}$ Stage Catalyst | S-4211 | S-4261 | S-4261 |
| 2$^{nd}$ Stage Catalyst | S-4212 | S-4252/ S-4213 Stacked Bed | S-4252/ S-4213 Stacked Bed |
| 1$^{st}$ Stage Catalyst Weight, g | 210 | 200 | 275 |
| 2$^{nd}$ Stage Catalyst Weight, g | 705 | 130 (S-4252) 390 (S-4213) | 130 (S-252) 390 (S-4213) |
| Weight of feedstock processed, g (MAF) | 784.1 | 691.6 | 567.9 |
| Duration of feedstock processing, min | 177.5 | 217.0 | 154 |

TABLE 2

| Feedstock Analysis | Example-1 | Example-2 | Example-3 |
|---|---|---|---|
| $^1$Moisture, wt % | 6.51 | 6.55 | 8.41 |
| Ash, wt % (dry basis) | 0.34 | 0.16 | 0.45 |

$^1$Moisture content is estimated from weight loss of the sample after drying at 103 ± 2° C.

TABLE 3

Elemental Analysis (Moisture and Ash-Free (MAF) Basis)

|  | Example-1 | Example-2 | Example-3 |
|---|---|---|---|
| Carbon, wt % | 47.2 | 47.2 | 47.2 |
| Hydrogen, wt % | 6.5 | 6.5 | 6.5 |
| Oxygen, wt % | 46.2 | 46.2 | 46.2 |
| Sulfur, wt % | 0.030 | 0.030 | 0.030 |
| Nitrogen, wt % | 0.027 | 0.027 | 0.027 |
| Feedstock H:C Atomic Ratio | 1.64 | 1.64 | 1.64 |

TABLE 4

Operating Conditions

|  | Example-1 | Example-2 | Example-3 |
|---|---|---|---|
| Average temperature in 1$^{st}$ stage (° C.) | 443.7 | 441.8 | 433.3 |
| Average temperature in 2$^{st}$ stage (° C.) | 410.5 | 215.9 | 193.7 |
| Average pressure (MPa(gauge)) | 2.25 | 2.24 | 2.70 |

TABLE 5

Yield Details

| All on MAF basis | Example-1 | Example-2 | Example-3 |
|---|---|---|---|
| C4+ Hydrocarbon Yield (wt %,) | 26.6 | 23.5 | 24.9 |
| C1-C3 Hydrocarbon | 15.1 | 20.6 | 21.9 |

TABLE 5-continued

Yield Details

| All on MAF basis | Example-1 | Example-2 | Example-3 |
|---|---|---|---|
| Yield (wt %) | | | |
| CO Yield (wt %) | 7.4 | 0.2 | 0.0 |
| $CO_2$ Yield (wt %) | 4.0 | 0.0 | 0.0 |
| Char & Ash Yield (wt %) | 8.6 | 11.9 | 15.6 |
| Water Yield (wt %) | 36.3 | 47.6 | 54.5 |
| Hydrogen added (wt %) | 4.35 | 7.34 | 8.82 |

TABLE 6

Condensed Hydrocarbon Liquid Analysis

| | Example-1 | Example-2 | Example-3 |
|---|---|---|---|
| Oxygen Content (wt %) | [4]BDL | [4]BDL | [4]BDL |
| Carbon Content (wt %) | 88.76 | 85.84 | 85.80 |
| Hydrogen Content (wt %) | 11.43 | 14.26 | 14.38 |
| Density (g/mL, at 15° C.) | 0.8365 | 0.7840 | 0.7789 |
| Gasoline[2] in C4+ Hydrocarbon (%) | 69 | 83 | 83 |
| Diesel[3] in C4+ Hydrocarbon (%) | 31 | 17 | 17 |
| Total Acid Number (TAN) | <0.01 | 0.012 | <0.01 |
| H/C Atomic Ratio | 1.53 | 1.98 | 2.00 |

[2]Gasoline is defined here as containing hydrocarbons having between 4 and 10 carbon atoms.
[3]Diesel is defined here as containing hydrocarbons with 11 or more carbon atoms.
[4]BDL = below detection limits (0.01 wt % for oxygen measurement)

TABLE 7

C1-C3 Gas Composition*

| | Example-1 | Example-2 | Example-3 |
|---|---|---|---|
| Methane wt % | 25.5 | 45.2 | 45.3 |
| Ethane wt % | 44.1 | 32.8 | 32.5 |
| Propane wt % | 30.4 | 22.1 | 22.2 |

*normalised to 100%

TABLE 8

Water Analysis

| | Example-1 | Example-2 | Example-3 |
|---|---|---|---|
| pH | 9.2 | 7.8 | 9.3 |
| Density (g/mL, at 15° C.) | 1.0006 | 0.9990 | 0.9990 |
| Sulfur Content (ppmw) | 264 | 2.5 | 4.1 |
| Nitrogen Content (ppmw) | 1132 | 34.5 | 61.8 |
| Carbon Content (wt %) | 0.03 | 0.02 | 0.01 |

That which is claimed is:

1. A process for producing liquid hydrocarbon products from at least one of a biomass-containing feedstock and a biomass-derived feedstock, the process comprising the steps of:
   a) contacting the biomass-containing feedstock and/or biomass-derived feedstock with a hydropyrolysis catalyst composition and molecular hydrogen in a hydropyrolysis reactor vessel at a temperature in a range of from 350 to 600° C., a pressure in a range of from 0.50 to 7.50 MPa and a WHSV of no more than 2.0 kg(biomass)/hour/kg(catalyst), to produce a product stream comprising a deoxygenated hydrocarbon product, $H_2O$, $H_2$, $CO_2$, CO, $C_1$-$C_3$ gases, char and catalyst fines;
   b) removing all or a portion of the char and catalyst fines from the product stream thereby producing a remaining product stream;
   c) cooling the remaining product stream to a temperature of no more than 300° C.; and
   d) hydroconverting all or a portion of the deoxygenated hydrocarbon product in a hydroconversion reactor in the presence of: (i) one or more catalyst compositions suitable for the aromatic saturation of the deoxygenated hydrocarbon product, and (ii) the $H_2O$, $CO_2$, CO, $H_2$, and $C_1$-$C_3$ gases generated in step a), to produce a product comprising $C_{4+}$ hydrocarbon product, $H_2O$, CO, $CO_2$, and $C_1$-$C_3$ gases, wherein at least one of the catalyst compositions in the hydroconversion reactor comprises one or more active metals selected from ruthenium, rhodium, palladium, osmium, iridium, and platinum on an oxide support.

2. The process as claimed in claim 1, wherein the hydropyrolysis catalyst composition comprises one or more active metals selected from cobalt, molybdenum, nickel, tungsten, ruthenium, platinum, palladium, iridium and iron on a metal oxide support.

3. The process as claimed in claim 1, wherein the hydropyrolysis reactor vessel is a bubbling fluidised bed reactor.

4. The process as claimed in claim 1, wherein the WHSV in the hydropyrolysis reactor vessel is no more than 1.5 $h^{-1}$ and at least 0.2 $h^{-1}$.

5. The process as claimed in claim 1, wherein the deoxygenated hydrocarbon product has an oxygen content of no more than 5 wt %.

6. The process as claimed in claim 1, wherein the remaining product stream is cooled in step c) to a temperature of at least 100° C.

7. The process as claimed in claim 1, wherein the cooling results in condensation of aqueous and organic materials and any non-organic liquid produced is removed.

8. The process as claimed in claim 1, wherein before or after cooling the remaining product stream is subjected to sulfur removal.

9. The process as claimed in claim 1, wherein the one or more active metals present in the one or more catalyst compositions in the hydroconversion reactor are selected from palladium and platinum.

10. The process as claimed in claim 1, wherein the hydroconversion reactor is a fixed bed reactor.

11. The process as claimed in claim 1, wherein the one or more catalyst compositions in the hydroconversion reactor further comprises a second catalyst composition comprising one or more active metals selected from cobalt, molybdenum, nickel and tungsten.

12. A process as claimed in claim 1, wherein the $C_{4+}$ hydrocarbon product has an aromatics content of less than 10 wt %.

13. A process for producing liquid hydrocarbon products from at least one of a biomass-containing feedstock and a biomass-derived feedstock, the process comprising the steps of:
   a) contacting the biomass-containing feedstock and/or biomass-derived feedstock with a hydropyrolysis catalyst composition and molecular hydrogen in a hydropyrolysis reactor vessel at a temperature in a range of from 350 to 600° C., a pressure in a range of from 0.50 to 7.50 MPa and a WHSV of no more than 2.0 kg(biomass)/hour/kg(catalyst), to produce a product stream comprising a deoxygenated hydrocarbon product, $H_2O$, $H_2$, $CO_2$, CO, $C_1$-$C_3$ gases, char and catalyst fines, wherein the hydropyrolysis catalyst composition comprises one or more active metals selected from cobalt, molybdenum, nickel, and tungsten on a metal oxide support;

b) removing all or a portion of the char and catalyst fines from the product stream thereby producing a remaining product stream;

c) cooling the remaining product stream to a temperature of no more than 300° C.; and d) hydroconverting all or a portion of the deoxygenated hydrocarbon product in a hydroconversion reactor in the presence of: (i) one or more catalyst compositions suitable for the aromatic saturation of the deoxygenated hydrocarbon product, and (ii) the $H_2O$, $CO_2$, CO, $H_2$, and $C_1$-$C_3$ gas generated in step a), to produce a product comprising $C_{4+}$ hydrocarbon product, $H_2O$, CO, $CO_2$, and $C_1$-$C_3$ gases, wherein at least one of the one or more catalyst compositions in the hydroconversion reactor comprises one or more active metals selected from ruthenium, rhodium, palladium, osmium, iridium, and platinum on an oxide support.

14. The process as claimed in claim 13, wherein the deoxygenated hydrocarbon product has an oxygen content of no more than 5 wt %.

15. The process as claimed in claim 13, wherein the one or more catalyst compositions in the hydroconversion reactor further comprises a second catalyst composition comprising one or more active metals selected from cobalt, molybdenum, nickel and tungsten.

16. The process as claimed in claim 15, wherein the catalyst compositions are present in a stacked bed catalyst system as separate catalyst beds.

17. The process as claimed in claim 13, wherein the product stream is cooled in step c) to a temperature of no more than 250° C.

18. A process for producing liquid hydrocarbon products from at least one of a biomass-containing feedstock and a biomass-derived feedstock, the process comprising the steps of:

a) contacting the biomass-containing feedstock and/or biomass-derived feedstock with a hydropyrolysis catalyst composition and molecular hydrogen in a hydropyrolysis reactor vessel at a temperature in a range of from 350 to 600° C., a pressure in a range of from 0.50 to 7.50 MPa and a WHSV of no more than 2.0 kg(biomass)/hour/kg(catalyst), to produce a product stream comprising a deoxygenated hydrocarbon product, $H_2O$, $H_2$, $CO_2$, CO, $C_1$-$C_3$ gases, char and catalyst fines;

b) removing all or a portion of the char and catalyst fines from the product stream thereby producing a remaining product stream;

c) cooling the remaining product stream to a temperature of no more than 300° C.; and d) hydroconverting all or a portion of the deoxygenated hydrocarbon product in a hydroconversion reactor in the presence of: (i) one or more catalyst compositions suitable for the aromatic saturation of the deoxygenated hydrocarbon product, and (ii) the $H_2O$, $CO_2$, CO, $H_2$, and $C_1$-$C_3$ gases generated in step a), to produce a product comprising $C_{4+}$ hydrocarbon product, $H_2O$, CO, $CO_2$, and $C_1$-$C_3$ gases, wherein the one or more catalyst compositions in the hydroconversion reactor comprises a first catalyst composition comprising one or more active metals selected from ruthenium, rhodium, palladium, osmium, iridium, and platinum, and a second catalyst composition comprising one or more active metals selected from cobalt, molybdenum, nickel, and tungsten.

19. The process as claimed in claim 18, wherein the first and second catalyst compositions are present in a stacked bed catalyst system and wherein the first and second catalyst compositions are present as separate catalyst beds.

20. The process as claimed in claim 18, wherein the hydropyrolysis catalyst composition comprises one or more active metals selected from cobalt, molybdenum, nickel, tungsten, ruthenium, platinum, palladium, iridium and iron on a metal oxide support.

* * * * *